(12) United States Patent
Hisada et al.

(10) Patent No.: US 7,195,691 B2
(45) Date of Patent: Mar. 27, 2007

(54) OPTICAL DATA RECORDING MEDIUM AND MANUFACTURING METHOD FOR THE SAME

(75) Inventors: Kazuya Hisada, Osaka (JP); Eiji Ohno, Hirakata (JP); Kazuhiro Hayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 90 days.

(21) Appl. No.: 10/608,190

(22) Filed: Jun. 30, 2003

(65) Prior Publication Data

US 2004/0027974 A1   Feb. 12, 2004

(30) Foreign Application Priority Data

Jul. 4, 2002   (JP)   ............................ P2002-195436
Nov. 22, 2002  (JP)   ............................ P2002-339063

(51) Int. Cl.
   *B32B 37/00*   (2006.01)
(52) U.S. Cl. ............................... 156/273.5; 156/275.7; 156/275.5; 369/283; 369/286; 369/275.1
(58) Field of Classification Search .................. 156/74, 156/273.5, 275.5; 369/272.1, 284
   See application file for complete search history.

(56) References Cited

U.S. PATENT DOCUMENTS

| | | |
|---|---|---|
| 5,183,597 A | 2/1993 | Lu |
| 5,614,938 A | 3/1997 | Sugiyama et al. |
| 5,708,652 A | 1/1998 | Ohki et al. |
| 5,759,332 A * | 6/1998 | Itoigawa et al. ......... 156/273.5 |
| 5,804,017 A | 9/1998 | Hector |

(Continued)

FOREIGN PATENT DOCUMENTS

EP   1 158 505   11/2001

(Continued)

OTHER PUBLICATIONS

Patent Abstracts of Japan, entitled "*Optical Recording Medium and Its Manufacture*", vol. 1999, No. 01, Jan. 29, 1999 & JP 10 283683, Oct. 23, 1998.

*Primary Examiner*—Richard Crispino
*Assistant Examiner*—Christopher Schatz
(74) *Attorney, Agent, or Firm*—Wenderoth, Lind & Ponack, L.L.P.

(57) ABSTRACT

An optical disc manufacturing method suppresses thickness variation in intermediate layers disposed between any two data recording layers to achieve an intermediate layer of uniform thickness. A substrate having a center hole and data recording layer is first prepared. This center hole is then plugged with a capping member and a resin material is dripped from above the center hole while spinning the substrate around its center hole to coat the data recording layer with the resin by a spin coating method. The capping member is then removed. Then, a stamper having a groove or lands and pits on its surface is prepared. The groove or lands and pits side of the stamper is then pressed into the resin material on the substrate, and the resin is then cured to form an intermediate layer. The stamper is then separated from the substrate to leave a data recording layer in the surface of the intermediate layer with a groove or land-and-pit pattern corresponding to the groove or lands and pits in the stamper.

17 Claims, 24 Drawing Sheets

U.S. PATENT DOCUMENTS

| | | | |
|---|---|---|---|
| 5,888,433 A * | 3/1999 | Amo .......................... | 264/1.33 |
| 6,023,451 A | 2/2000 | Kashiwagi et al. | |
| 6,077,349 A | 6/2000 | Kikuchi | |
| 6,136,133 A * | 10/2000 | Maruyama et al. ...... | 156/273.5 |
| 6,270,611 B1 | 8/2001 | Ohki et al. | |
| 6,349,086 B2 | 2/2002 | Nishida et al. | |
| 6,613,170 B1 * | 9/2003 | Ohno et al. ................... | 156/64 |
| 6,613,396 B1 | 9/2003 | Nishida et al. | |
| 6,797,090 B2 * | 9/2004 | Yang et al. .................. | 156/74 |
| 2001/0053121 A1 * | 12/2001 | Komaki et al. ............. | 369/283 |

FOREIGN PATENT DOCUMENTS

| | | |
|---|---|---|
| JP | 8-329532 | 12/1996 |
| JP | 9-7230 | 1/1997 |
| JP | 9-63112 | 3/1997 |
| JP | 11-203724 | 7/1999 |
| JP | 2001-357571 | 12/2001 |

* cited by examiner

OPTICAL DATA RECORDING MEDIUM AND MANUFACTURING METHOD FOR THE SAME

BACKGROUND OF THE INVENTION

1. Field of the Invention

The present invention relates to an optical data recording medium having two or more data recording layers, and to a manufacturing method for this optical data recording medium.

2. Description of Related Art

Optical data recording media such as optical discs are quickly becoming the information recording medium of choice for a wide range of applications. Common types of optical discs include read-only, incrementally writable (e.g., multisession), and rewritable media. Compact Discs (CDs) used for distributing packaged audio content and Laser Discs for recording video data (such as movies) are typical read-only optical discs. Multisession CDs for storing text files and still images, for example, are typical of incrementally writable media. Rewritable media include a variety of recordable discs for storing personal computer data files and other types of content.

One advantage of optical media is that optical discs enable a significantly higher data recording density than the magnetic data recording density of conventional magnetic disks. Optical media can also be written and read without the read/write head physically contacting the disc. Durability with respect to vibration and electromagnetic fields can therefore be improved and disc life can be increased.

Optical discs today typically have a data recording layer disposed to a 1.2 mm thick transparent resin substrate protected by an overcoat, or a data recording layer disposed to one or both of two 0.6 mm thick transparent resin substrates that are then bonded together to form the optical disc.

High capacity Digital Versatile Discs (DVD) have also been developed for recording movies and other types of video content in addition to audio. A short wavelength laser and an objective lens with a large numerical aperture (NA) are used to achieve high density DVD media. A short wavelength and high NA, however, decrease the tolerance for tilt, i.e., an inclination of the disc to the incidence angle of the laser beam.

One effective way to increase tilt tolerance is to decrease substrate thickness. DVD, for example, use a 650 nm wavelength laser, 0.60 NA, and 0.6 mm substrate thickness. Because a 0.6 mm thick resin substrate is mechanically weak, two substrates are bonded together with the data recording surfaces to the inside. This bonded substrate construction has also been used to make DVD discs with two recording (playback) layers on a single side of the disc. DVD discs having two recording layers on a single side form a transparent reflective layer of gold and silicon, for example, on the data recording surface of one of the two substrates, have a conventional reflective layer of aluminum, for example, on the other data recording surface, and are bonded with the data recording layers on the inside. During playback both data recording layers are read from the side of the disc to which the transparent reflective layer was formed.

Rewritable DVD media having a two-layer construction but having a rewritable thin-film recording layer on the data recording surface instead of a metallic reflective layer have also been proposed.

Data transmission volume has also increased in recent years with the advent of HDTV broadcasting, for example, thus necessitating a further increase in the data recording density of recording media. One way to increase the recording density is to shorten the wavelength of the read/write laser and increase the NA of the objective lens. In this case, reducing the thickness of the substrate on the read/write side to which the laser beam is incident can reduce the effect of aberrations on the laser spot and increase tolerance to disc tilt. It has therefore been proposed to set the substrate thickness on the read/write side of the disc to approximately 0.1 mm and use a 0.85 NA and a 400 nm laser. (See, for example, Japanese Laid-Open Patent Publication No. 2001-357571.) In this case, variation in the thickness of the read/write side substrate is preferably 5% or less considering the effect on spherical aberration and focusing the read/write beam.

Multilayer discs with two or more data recording layers in a single disc have been designed to achieve a high data density. With optical discs having two or more data recording layers (referred to below as a "multilayer discs") the laser is emitted to each of the multiple data recording layers from a single side of the disc to read data from each layer. This means that as seen from the laser-emission side of the disc information on any data recording layer other than the first layer is read through any intermediate layers located between adjacent recording layers. These intermediate layers are thus the transmission path of the laser beam used to read the data. The thickness of these intermediate layers is therefore as uniform as possible.

The intermediate layers disposed between two data recording layers in such multilayer discs are often formed by spin-coating the resin material. For example, in an optical disc with two data recording layers a resin material is applied by spin coating to the first data recording layer formed on the substrate and then cured to form an intermediate layer.

Unfortunately, it is difficult with conventional spin coating techniques to apply the resin material with a uniform thickness from the inside circumference side to the outside circumference side of the disc. More particularly, there is a tendency for the applied resin material to be thin at the inside circumference and thick at the outside circumference side of the disc.

Multilayer discs as described above have very low tolerance to variation in the thickness of the layers that must be passed by the read/write laser. More specifically, a maximum deviation of only +/−2 µm is allowed in the thickness of the approximately 0.1 mm thick layers passed by the laser. Furthermore, because the read/write side substrate is a mere 0.3 mm thick, it cannot be formed by injection molding, and it is difficult to form these transparent layers to such stringent thickness specifications.

It is also difficult to injection mold data recording layers with grooves or pits and lands for a multilayer discs with layers 0.3 mm thick or less. The 2P method is well known as a non-injection molding method for forming grooves or pits and lands, but it is not easy to satisfy this strict tolerance for thickness deviation with the 2P method.

An object of the present invention is therefore to provide a manufacturing method for an optical data recording medium having two or more data recording layers whereby thickness deviation can be suppressed and an intermediate layer of uniform thickness can be formed between each of the adjacent two or more data recording layers.

SUMMARY OF THE INVENTION

To achieve this object, a manufacturing method for an optical data recording medium according to a first aspect of this invention includes steps of: preparing a substrate having a center hole and a data recording layer on one side; coating the data recording layer with a resin material by a spin coating method in which the center hole of the substrate is plugged with a capping member and the resin material is dripped from substantially above the capping member while spinning the substrate centered on the center hole; removing the capping member from the center hole; preparing a stamper having on one side a groove or lands and pits; pressing the groove or land-and-pit side of the stamper into the resin material on the substrate; forming an intermediate layer from the resin material by curing the resin material; and forming a data recording layer patterned according to the groove or lands and pits of the stamper in the surface of the intermediate layer on the above data recording layer by removing the stamper from the substrate.

Thus comprised, this optical disc manufacturing method of our invention can easily manufacture, by a spin coating method, an optical data recording medium having two data recording layers that are separated by an intermediate layer of uniform thickness.

A manufacturing method for an optical data recording medium according to a second aspect of the invention includes steps of: preparing a stamper having a center hole and a groove or lands and pits on one side; coating the groove or lands and pits of the stamper with a resin material by a spin coating method in which the center hole of the stamper is plugged with a capping member and the resin material is dripped from substantially above the capping member while spinning the stamper centered on the center hole; removing the capping member from the center hole; preparing a substrate having a data recording layer on one side; pressing the data recording layer side of the substrate against the resin material on the stamper; curing the resin material to form an intermediate layer from the resin material; and forming a data recording layer having a groove or lands and pits patterned according to the groove or lands and pits of the stamper in the surface of the intermediate layer on the data recording layer of the substrate by removing the substrate from the stamper.

In either manufacturing method described above, the step for applying the resin material by a spin coating method preferably includes steps of: applying a first resin material by a spin coating method by dripping the first resin material from substantially above the center hole while spinning the target about the center hole; curing the first resin material to form a first intermediate layer from the first resin material; and applying a second resin material on top of the first intermediate layer by a spin coating method by dripping the second resin material from substantially above the center hole while spinning the target about the center hole.

By thus dripping the first resin material from above the center hole to coat a substrate with the first resin material by a spin coating method, the resin material can move uniformly from the center to the outside edge part of the substrate, and an intermediate layer with uniform thickness can be achieved.

A manufacturing method for an optical data recording medium according to a third aspect of the invention includes steps of: preparing a substrate having a data recording layer on one side; coating the data recording layer with a first resin material by a spin coating method; curing the first resin material; preparing a stamper having a groove or lands and pits on one side; coating the groove or lands and pits with a second resin material using a spin coating method; pressing the cured first resin material on the substrate against the second resin material on the stamper; forming an intermediate layer composed of the first resin material and second resin material by curing the second resin material; and forming a data recording layer with a groove or lands and pits corresponding to the groove or lands and pits of the stamper in the surface of the intermediate layer on the data recording layer of the substrate by removing the substrate from the stamper.

A manufacturing method for an optical data recording medium according to a fourth aspect of the invention includes steps of: preparing a substrate having a data recording layer on one side; coating the data recording layer with a first resin material by a spin coating method; preparing a stamper having a groove or lands and pits on one side; coating the groove or lands and pits with a second resin material by a spin coating method; curing the first resin material; pressing the second resin material on the stamper against the first resin material on the substrate; curing the second resin material to form an intermediate layer with the first resin material and second resin material as two sublayers thereof; and forming a groove or lands and pits corresponding to the groove or lands and pits of the stamper in the surface of the intermediate layer by removing the stamper from the substrate.

In the manufacturing methods according to third and fourth aspects of the invention as described above, the step of applying the resin material by spin coating preferably includes steps of plugging the center hole of the substrate or stamper with a capping member, and applying the resin material by a spin coating method by dripping the resin material from substantially above the center hole.

Further preferably, the steps of pressing the substrate and stamper together are performed in a vacuum environment.

Yet further preferably, the resin material is a radiation curable resin.

The substrate and stamper may also be made from different materials.

Yet further preferably, these manufacturing methods further include, after the step of preparing a stamper, a step of treating the surface of the stamper that is pressed to the resin material so as to improve separation of the stamper from the resin material.

Yet further preferably, these methods also include, after the step of preparing a substrate, a step of treating the surface of the substrate opposing the resin material to improve adhesion with the resin material.

The thickness of the intermediate layer is preferably 5 to 35 μm, and yet further preferably within the range of 20 to 30 μm.

These manufacturing methods of our invention also preferably have steps of forming a recording film or reflective film on the groove or lands and pits formed in the intermediate layer, and forming a transparent layer over the groove or lands and pits.

The transparent layer is preferably made from a radiation curable resin.

Yet further preferably, the center hole of the substrate and the center hole of the stamper are substantially the same size.

The step of applying the resin material by spin coating preferably drives the target for three seconds or longer at a rotational velocity of 100 to 10,000 rpm, and further preferably spins the target for three seconds or longer at a rotational velocity of 100 to 5,000 rpm.

By repeating the step of applying the resin material by spin coating and the step of forming a recording film or reflective film over the groove or lands and pits multiple times, the method of our invention can form three or more data recording layers.

An optical data recording medium having two recording layers, that is, a first recording layer and a second recording layer, includes in a fifth aspect of this invention: a round substrate; a first recording layer having a groove or lands and pits on one side of the substrate; a first intermediate layer formed so as to fill the groove or lands and pits in the first recording layer; a second intermediate layer formed on the first intermediate layer; a second recording layer having a groove or lands and pits formed on the opposite side of the second intermediate layer from the first intermediate layer; and a transparent layer formed so as to fill the groove or lands and pits in the second recording layer. The interfacial surface between the first intermediate layer and the second intermediate layer has a slope in the radial direction from the inside circumference side to the outside circumference side of the substrate.

In the optical data recording medium according to this fifth aspect of the invention, the first and second recording layers each have a reflective film formed over the groove or lands and pits.

If the first intermediate layer is formed to be thin at the inside circumference side and thick at the outside circumference side, and the second intermediate layer is formed to be thick at the inside circumference side and thin at the outside circumference side, a single intermediate layer with uniform thickness can be formed by controlling the gradient of the first and second intermediate layers in this optical data recording medium. The interfacial surface between the first and second intermediate layers is inclined in the radial direction in this case. More specifically, this interfacial surface is inclined like the surface of a cone. While the first intermediate layer is described here as thick at the inside circumference side and thin at the outside circumference side, the invention is not so limited and this could be reversed.

The conditions for spin coating the resin material can be controlled so that the first intermediate layer is thin at the inside circumference side of the substrate and thick at the outside circumference side. For example, if the center hole of the substrate is closed with a capping member (i.e., a cap) and the resin material is dripped from above the cap to spin coat the resin to the substrate, a resin film that is thick at the inside circumference and thin at the outside circumference side can be easily formed.

The spin coating conditions of the resin material can also be controlled so that the second intermediate layer is thick at the inside and thin at the outside circumference side of the substrate. This can be achieved, for example, by not closing the center hole and applying the resin material with a conventional spin coating method at a specified rotational velocity. The optical data recording medium can then be completed by bonding these first and second intermediate layers together.

A manufacturing method for an optical data recording medium according to a sixth aspect of the invention includes steps of: preparing a first substrate; coating the first substrate with a radiation curable resin; curing the radiation curable resin in part; preparing a second substrate having a groove or lands and pits on one side; disposing a resin material to the side of the second substrate having the groove or lands and pits; and pressing the radiation curable resin of the first substrate and the resin material of the second substrate together.

An optical data recording medium with a thin transparent layer, and an optical data recording medium with multiple data recording layers can be manufactured by using this method of the invention. By changing the cured state of the radiation curable resin in different parts of the resin, thickness variations in the resin when the two substrates are put together can be suppressed in the cured part of the resin (that is, the highly polymerized part of the resin).

Furthermore, by providing an uncured (low polymerization state) part, thickness variations at the outside circumference edge can be suppressed and a uniform layer with extremely little variation in thickness can be formed.

In the method according to this sixth aspect of the invention, the step of curing in part the radiation curable resin coating the first substrate preferably changes the cured state of the radiation curable resin inside and outside a specified radius of the first substrate. This specified radius is preferably 90% or more of the radius of the first substrate.

Uniformity at the same radius in the radiation curable resin placed by the spin coating method is thus eliminated and a layer with uniform thickness can be achieved.

Preferably, an adhesive material is used for the resin material. Alternatively, a second radiation curable resin is used for the resin material. This makes it possible to produce a layer with high thickness precision at low cost.

The same radiation curable resin coated to the first substrate could also be used as the second radiation curable resin.

Yet further preferably, there is a step of curing in part the second radiation curable resin coating the second substrate. This makes it possible to suppress thickness variations in areas where the thickness tends to vary in part, and thereby achieve a layer with uniform thickness.

Yet further preferably, the step of curing in part the second radiation curable resin coating the second substrate changes the cured state of the second radiation curable resin inside and outside a specified radius of the second substrate. This specified radius is preferably 90% or more of the radius of the second substrate.

Uniformity at the same radius in the radiation curable resin placed by the spin coating method is thus eliminated and a layer with uniform thickness can be achieved.

Yet further preferably, after the step of pressing the first and second substrates together, there is also a step of curing the radiation curable resin by exposure to radiation.

Yet further preferably, at least one of the first and second substrates is substantially transparent to radiation for curing the radiation curable resin. This enables the radiation curable resin to be exposed to radiation through the transparent first or second substrate.

Further preferably, a groove or lands and pits are on the surface of the first substrate coated with the radiation curable resin. Yet further preferably, a groove or lands and pits are on the surface of the second substrate to which the resin material is disposed. By disposing the radiation curable resin or resin material to the surface having a groove or lands and pits, a groove or lands and pits corresponding to said groove or lands and pits can be formed in the resin.

The first substrate may have one or more recording layers. The second substrate may also have one or more recording layers.

This manufacturing method further preferably has a step of removing the first substrate or second substrate and forming a groove or lands and pits corresponding to the groove or lands and pits in the first substrate or second substrate.

After the step of removing the first substrate or second substrate, there is also preferably a step of forming a data recording layer by forming a reflective film over the groove or lands and pits.

Yet further preferably, there is an additional step of forming a transparent layer on the data recording layer.

Yet further preferably, the radiation curable resin disposed to the first substrate is selectively exposed to radiation to cure the resin in part. The second radiation curable resin disposed to the second substrate is also selectively exposed to radiation to cure the resin in part.

Yet further preferably, after the step of curing the radiation curable resin in part, there is an additional step of removing all or part of the uncured part of the radiation curable resin.

Yet further preferably, the step of coating the radiation curable resin to the first substrate applies the radiation curable resin by a spin coating method. In addition, the step of coating the first substrate with the radiation curable resin has steps of: closing the center hole of the first substrate with a capping member, and coating the radiation curable resin to the first substrate by dripping the resin from substantially above the center hole while spinning the first substrate centered on the center hole.

Yet further preferably, the step of coating the second substrate with the second radiation curable resin applies the second radiation curable resin by a spin coating method. In addition, the step of coating the second substrate with the second radiation curable resin has steps of: closing the center hole of the second substrate with a capping member, and coating the radiation curable resin to the second substrate by dripping the resin from substantially above the center hole while spinning the second substrate centered on the center hole.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become readily understood from the following description of preferred embodiments thereof made with reference to the accompanying drawings, in which like parts are designated by like reference numerals, and in which.

DETAILED DESCRIPTION OF THE PREFERRED EMBODIMENTS

Figure 1A:
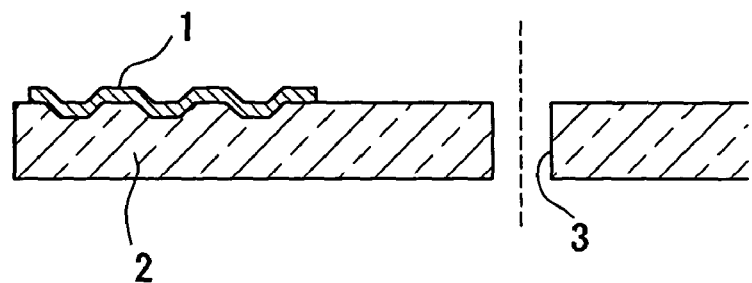
FIGS. 1A to 1C are side section views through the substrate and other layers in the radiation curable resin coating process of an optical disc manufacturing process according to a first embodiment of the present invention.

Preferred embodiments of an optical data recording medium and a manufacturing method therefor according to the present invention are described below with reference to the accompanying figures. It should be noted that like parts are identified by the same reference numerals in the accompanying figures.

First Embodiment

A manufacturing method for an optical data recording medium according to a first embodiment of the present invention is described first below with reference to FIG. 1 to FIG. 3. The manufacturing method for this optical data recording medium broadly includes the following processes.

Figure 2A:
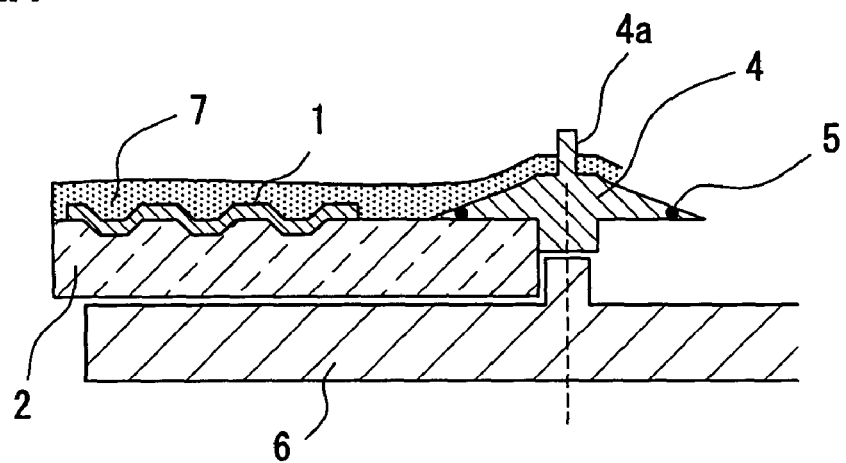
FIGS. 2A to 2C are side section views through the substrate, stamper, and other parts in the intermediate layer formation process of an optical disc manufacturing process according to a first embodiment of the present invention.

(a) First, as shown in FIG. 1A, a substrate 2 that is 1.1 mm thick, 120 mm in diameter, and has a data recording layer 1 on one side (referred to below as the "recording-layer-side surface") is prepared. A 15 mm diameter center hole 3 is formed through the thickness direction of the substrate 2 in the center of this substrate 2.

Figure 1B:
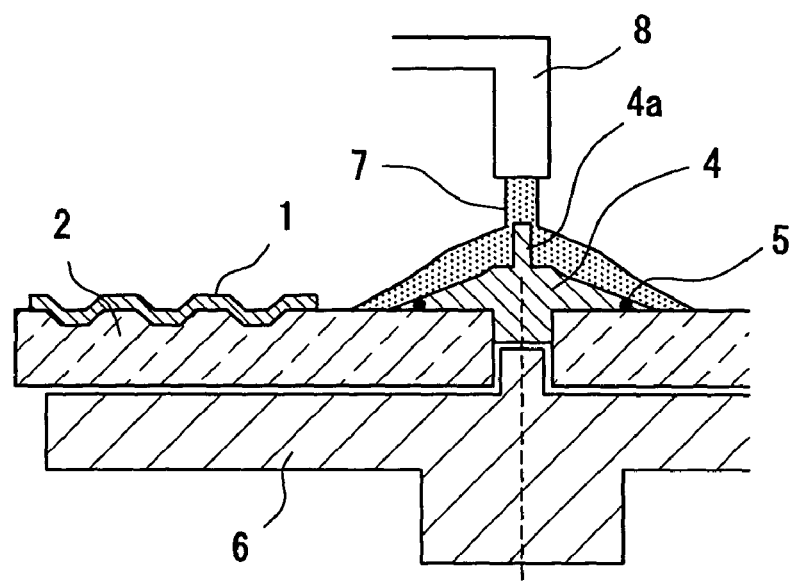

(b) Then, as shown in FIG. 1B, the substrate 2 is placed on a rotary table 6 with the recording-layer-side surface facing up, and the center hole 3 is then closed from above with a cap 4. The cap 4 is metal and has a seal ring 5 made of Teflon (R), for example, formed where the cap 4 contacts the recording-layer-side surface of the substrate 2. A stud 4a is disposed projecting upward from the top center of the cap 4. As more fully described below, the cap 4 is later removed from the substrate 2 by pulling up on this stud 4a.

Figure 1C:
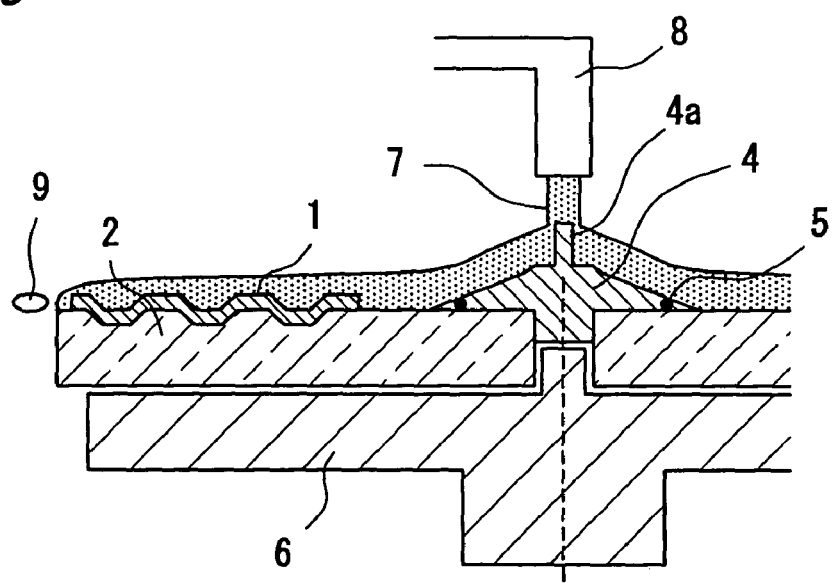

(c) While spinning the substrate 2, a radiation curable resin 7 (such as a UV curable resin) is dripped from a nozzle 8 onto substantially the center of the cap 4, i.e., the rotational center of the substrate 2, as shown in FIG. 1C. In other words, a radiation curable resin 7 film is formed on the recording-layer-side surface, and hence on the data recording layer 1, of the substrate 2 by a spin coating method.

The recording-layer-side surface and data recording layer 1 of the substrate 2 are preferably treated to improve adhesion with the radiation curable resin 7 or the intermediate layer 17 further described below. Instead of applying this treatment, the substrate 2 could alternatively be made from a material with good adhesion to the radiation curable resin 7 or intermediate layer 17, such as polycarbonate.

By dripping the radiation curable resin 7 as nearly as possible to the rotational center of the substrate 2 as shown in FIG. 1C, the thickness of the radiation curable resin 7 film on the recording-layer-side surface and data recording layer 1 of the substrate 2 can easily be formed to a uniform thickness from the inside circumference side to the outside circumference side of the substrate 2.

Furthermore, plugging the center hole 3 with a cap 4 and dripping the radiation curable resin 7 onto the cap 4 improves the uniformity of the thickness of the radiation curable resin 7 film.

By using substantially the frustum of a cone for the cap 4 as shown in FIG. 1B and FIG. 1C, the radiation curable resin 7 can be deposited with uniform thickness in the circumferential direction of the substrate while also minimizing thickness variation in the radial direction.

Note that part of the radiation curable resin 7 is spun off the substrate 2 as drops 9.

Spin coating techniques often result in some amount of radiation curable resin 7 penetrating the small gap between the cap 4 and substrate 2 when the radiation curable resin 7 is dripped onto the recording-layer-side surface and data recording layer 1 of the substrate 2.

This is prevented in the spin coating method of the present invention, however, by the seal ring 5 disposed to the cap 4. If a mechanism for pushing the cap 4 down onto the substrate 2 and removing the cap 4 is used, an even better seal can be formed between the cap 4 and substrate 2.

The viscosity of radiation curable resin 7 dripped from the nozzle 8 onto the cap 4 is in the range 10 to 5000 mPa.s. If the viscosity is lower than 10 mPa.s waves will form in the radiation curable resin 7 where the cap 4 contacts the recording-layer-side surface of the substrate 2, depending on the shape of the cap 4, producing variations in the thickness of the radiation curable resin 7 layer. Further, if the viscosity is greater than 5000 mPa.s, the tact time becomes too long.

Note that a viscosity of 5000 mPa.s or less is preferable when forming the radiation curable resin 7 layer to a thickness of approximately 25 μm (target thickness) if a tact time of 30 seconds or less is to be achieved.

However, in order to assure uniform film thickness in the radiation curable resin 7 layer of the substrate 2, the viscosity of radiation curable resin 7 dripped from the nozzle 8 onto the cap 4 is preferably 30 to 1000 mPa.s, and yet further preferably 40 to 500 mPa.s.

When applying the radiation curable resin 7 by spin coating, the substrate 2 is preferably spun for at least 3 seconds at 10,000 rpm or less. Because the radiation curable resin 7 is dripped continuously onto the spinning substrate 2, even a slight deviation between where the radiation curable resin 7 is dripped and the rotational center of the substrate 2 can cause problems for dripping and supplying the radiation curable resin 7 if the substrate 2 turns at more than 10,000 rpm. Furthermore, if the rotational velocity of the substrate 2 exceeds 10,000 rpm, it becomes difficult to control variation in the thickness of the radiation curable resin 7 film radially to the substrate 2.

However, if the substrate 2 spins at less than 100 rpm the radiation curable resin 7 does not spread easily and variation in the thickness of the radiation curable resin 7 film increases in the circumferential direction of the substrate 2. The substrate 2 therefore preferably spins at 100 rpm or faster.

Even more preferably, the rotational velocity of the substrate 2 is in the range 100 to 5000 rpm to achieve greater uniformity in the thickness of the radiation curable resin 7 film on the substrate 2.

The rotational velocity of the substrate 2 when spin coating the radiation curable resin 7 preferably increases for a specified time (such as 3 seconds or less) at an acceleration rate of 1000 rpm/second or more. Variation in the thickness of a radiation curable resin 7 film formed by spin coating tends to occur easily at the circumferential edge part of the substrate 2. This edge variation can be prevented, however, by accelerating the substrate 2 and increasing the rotational velocity as described above, thereby improving uniformity in the thickness of the radiation curable resin 7 film on the substrate 2.

Sudden acceleration of the substrate 2 also causes drops 9 of excess radiation curable resin 7 to spin off the substrate 2. This helps shorten the tact time.

Figure 9:
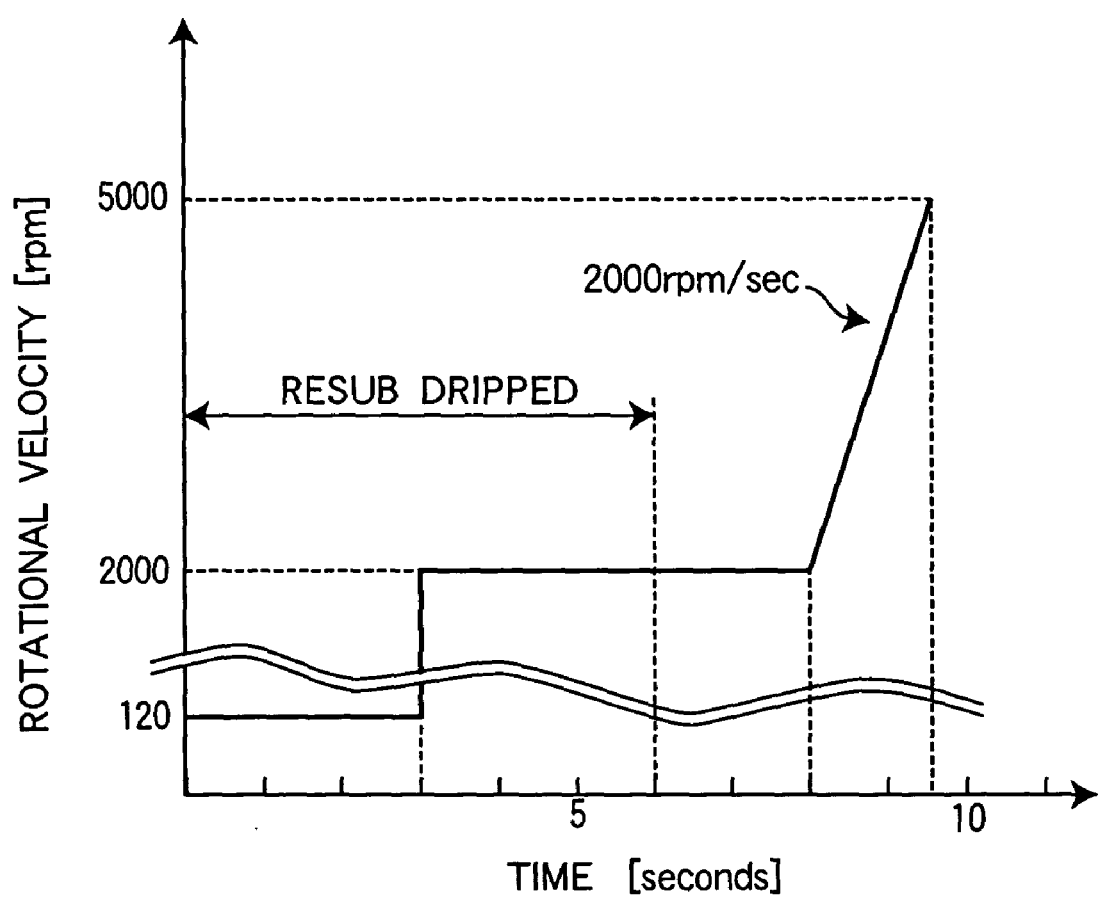
FIG. 9 is a graph showing the relationship between time and the rotational velocity of the substrate when applying the radiation curable resin by a spin coating method.

FIG. 9 is a timing chart showing the relationship between time and the rotational velocity of substrate 2 when applying the radiation curable resin 7 by a spin coating method as described above. Resin viscosity was controlled to 300 mPa.s, and the radiation curable resin 7 was dripped at 0.3 g/second for 6 seconds from the time the substrate 2 started spinning. The substrate 2 was spun at 120 rpm for 3 seconds from the start of substrate 2 rotation, and was then set to 2000 rpm for 5 seconds. Substrate rotation was then accelerated at 2000 rpm/second for 1.5 seconds, and the substrate 2 was then stopped.

As a result, a radiation curable resin 7 layer of substantially uniform thickness is formed on the recording-layer-side surface and data recording layer 1 of the substrate 2. It should be noted that by adjusting the composition of the radiation curable resin 7 or the rotation (e.g., the rotational velocity) of the substrate 2 the thickness of the radiation curable resin 7 can be made thicker or thinner from the inside circumference side to the outside circumference side of the substrate 2. In other words, the radiation curable resin 7 layer can be formed with a slope increasing in thickness from the inside to the outside circumference of the disc, or conversely decreasing in thickness.

Figure 2B:
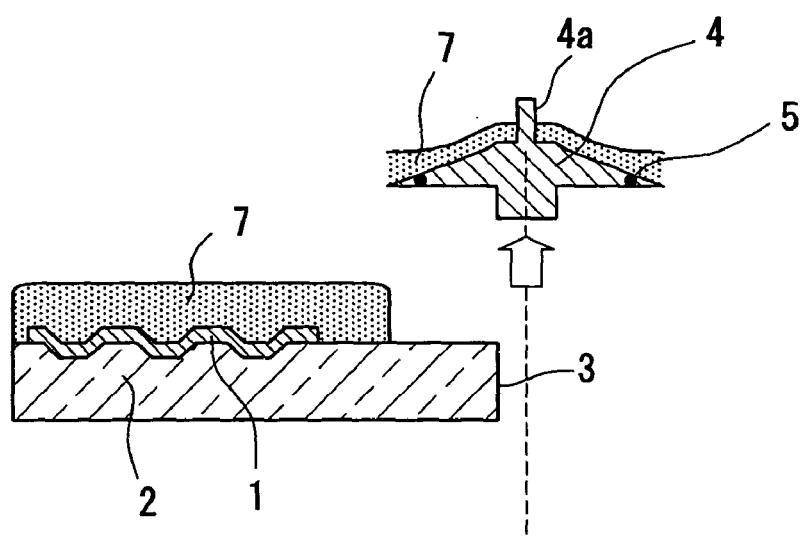

Next, as shown in FIG. 2B, the stud 4a passing through the radiation curable resin 7 layer and projecting upward from the disc is held and pulled upward to move the cap 4 straight up and away from the substrate 2 (i.e., the stud 4a is pulled up to remove the cap 4).

Figure 2C:
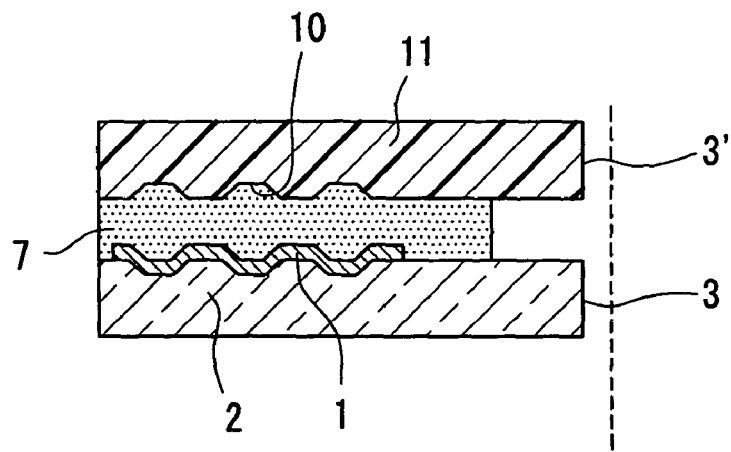

Then, as shown in FIG. 2C, a stamper 11 having a groove or pits and lands 10 (referred to below as simply "pits 10") on one side (the "pit side" below) is pressed to the substrate 2 with the pit side of the stamper 11 in contact with the radiation curable resin 7. The stamper 11 is pressed to the substrate 2 under vacuum conditions in a vacuum chamber (not shown).

The stamper 11 is also 0.6 mm thick, and the outside diameter and the diameter of the center hole 3' of the stamper 11 are both identical to those of the substrate 2. The outside diameter of the stamper 11 is thus 120 mm and the diameter of the center hole 3' is 15 mm in this embodiment of the invention.

The pit side surface of the stamper 11 is treated to improve release of the stamper 11 from an intermediate layer 17 further described below. It should be noted that instead of using this treatment the stamper 11 could be manufactured from a material that separates easily from the intermediate layer 17, such as acrylic or polyolefin resin in this embodiment.

Furthermore, the substrate 2 and stamper 11 can be made of the same material or from different materials.

The center hole 3 of the substrate 2 and the center hole 3' of the stamper 11 are also substantially the same size. This makes it easier to substantially align the center of the data recording layer 1 and the center of the pits 10.

After then curing the radiation curable resin 7 layer by exposure to radiation (such as UV light) to form the intermediate layer 17, the stamper 11 is removed as shown in FIG. 3. This results in the inverse of the pattern of pits 10 on the stamper 11 being formed in the intermediate layer 17.

The thickness of this intermediate layer 17 is preferably in the range 5 to 35 μm, and yet further preferably in the range 20 to 30 μm.

It should be further noted that "radiation" as used herein refers to any type of radiation that can be used to cure the radiation curable resin, including electromagnetic, infrared, visible light, UV light, X-ray, and other types of radiation.

Figure 3A:
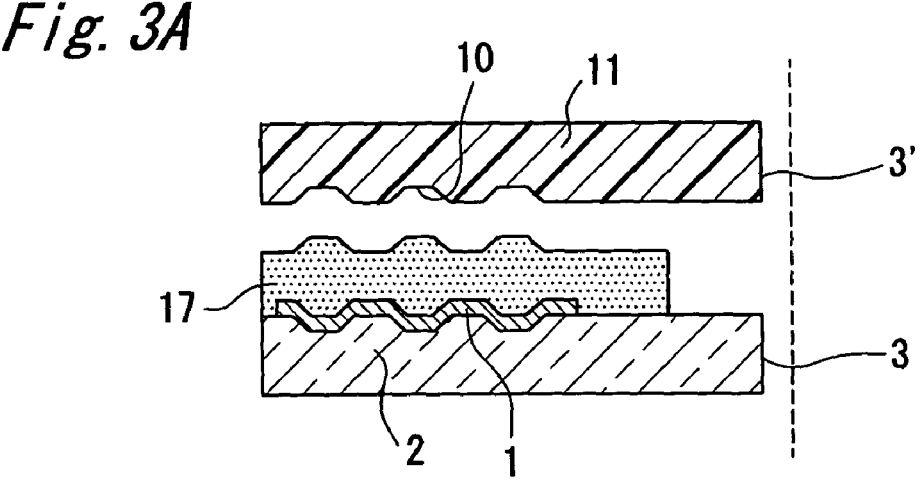
FIGS. 3A to 3D are side section views through the substrate and other layers in the data recording layer formation process of an optical disc manufacturing process according to a first embodiment of the present invention.
Figure 3B:
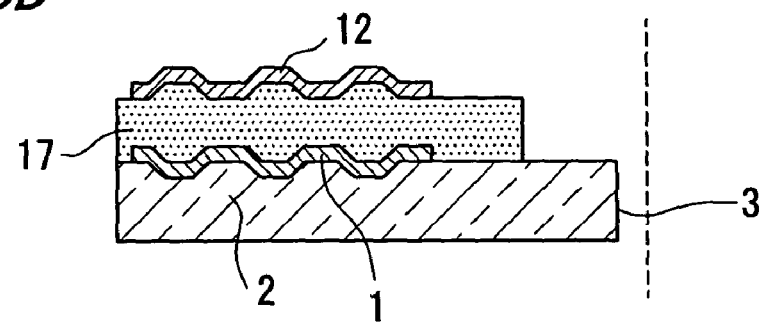

Another data recording layer 12 (recording film or reflective film) is then formed over the pits and lands (or groove) in the intermediate layer 17 as shown in FIG. 3B.

Figure 3C:
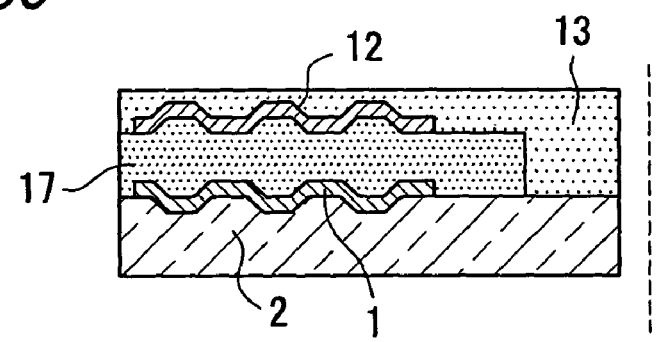

A transparent protective layer 13 made from a transparent radiation curable resin is then formed over the intermediate layer 17 and substrate 2 to protect the resulting optical disc as shown in FIG. 3C.

This completes the optical disc with two data recording layers 1 and 12.

The thickness of the transparent protective layer 13 is 0.1 mm (100 μm). Because the thickness of the data recording layer of the substrate 2 is 1.1 mm as noted above, the thickness of this optical disc is 1.2 mm. More specifically, the thickness of this optical disc is equal to the thickness of standard CD and DVD media, and this optical disc is also compatible with standard CD and DVD media.

Figure 3D:
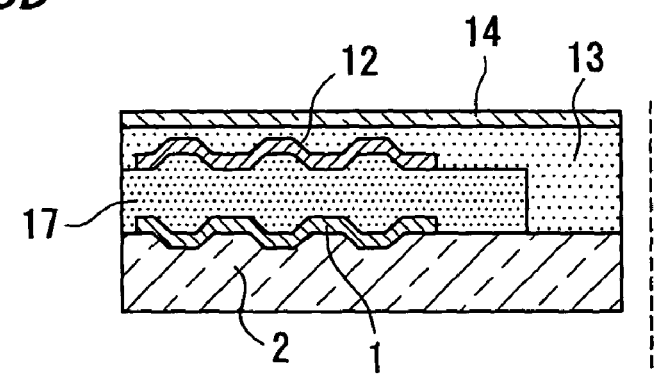

If it is necessary to provide even stronger protection for this optical disc, a further transparent protective coating 14 can be disposed on top of the protective layer 13 as shown in FIG. 3D.

The protective layer 13 could also be formed by bonding a resin sheet to the protective layer 13 using a radiation curable resin or adhesive.

It will thus be obvious that the optical disc manufacturing method according to this embodiment of the present invention can be used to easily manufacture, by means of a spin coating technique, an optical disc having two data recording layers 1, 12 separated by an intermediate layer 17 of uniform thickness.

Second Embodiment

An optical disc manufacturing method according to a second embodiment of the present invention is described next with particular reference to FIG. 4 and FIG. 5.

This embodiment differs from the optical disc manufacturing method of the first embodiment in that the positions of the substrate 2 and stamper 11 are reversed, the radiation curable resin is coated to the stamper 11, and the substrate 2 is then pressed to the resin-coated stamper 11.

In addition, the seal ring 5 is not provided on the cap 4. Instead, a magnet is disposed to the cap 4 so that the cap 4 is attracted to a corresponding magnet disposed to the rotary table 6 to improve adhesion and the seal between the cap 4 and substrate 2.

The optical disc manufacturing method of this embodiment is described in detail next.

Figure 4A:
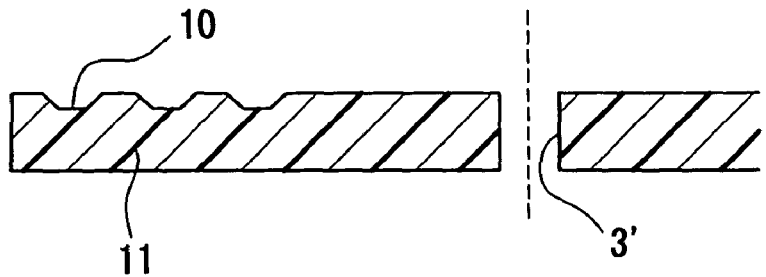
FIGS. 4A to 4C are side section views through the stamper and other parts in the radiation curable resin coating process of an optical disc manufacturing process according to a second embodiment of the present invention.
Figure 4B:
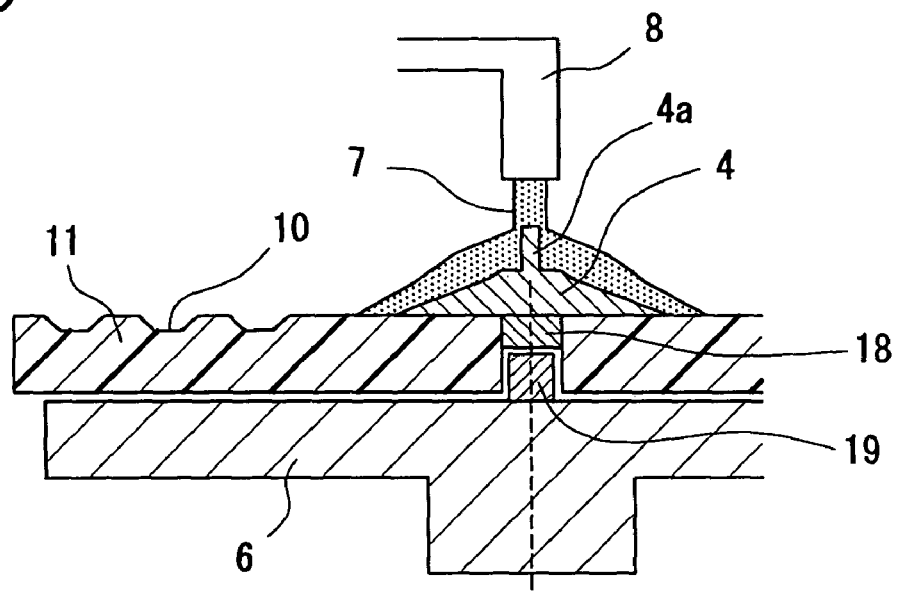

(a) First, as shown in FIG. 4A, a stamper 11 with center hole 3' and pits 10 is prepared as described in the first embodiment above.

(b) The stamper 11 is then placed on the rotary table 6 with the pit side of the stamper 11 facing up, and the center hole 3' is then plugged from above with the cap 4. At this time the magnet 18 disposed to the cap 4 with, for example, the north pole facing down (toward the rotary table 6) is drawn to the magnet 19 disposed to the rotary table 6 with the opposite pole (south in this case) facing up (toward the cap 4), thereby holding the cap 4 tight to the substrate 2.

(c) While spinning the stamper 11, a radiation curable resin 7 is dripped from a nozzle 8 onto substantially the center of the cap 4, i.e., the rotational center of the stamper 11. In other words, a radiation curable resin 7 film is formed on the pit side surface and pits 10 of the stamper 11 by a spin coating method. The pit side surface and pits 10 of the stamper 11 are pretreated to improve separation from the intermediate layer 17, or the stamper 11 is made from a material with good release characteristics.

Figure 4C:
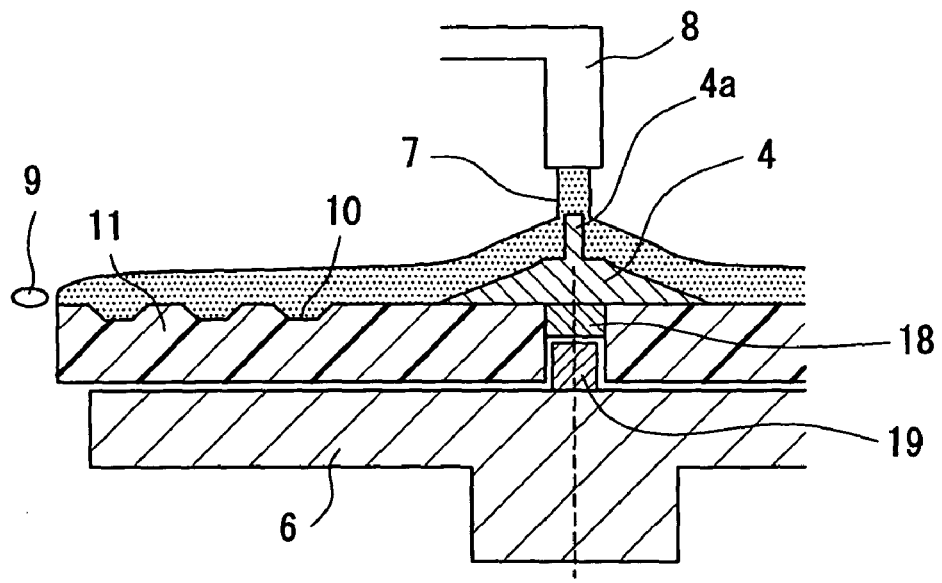

By dripping the radiation curable resin 7 as near as possible to the rotational center of the stamper 11 as shown in FIG. 4C, the radiation curable resin 7 film on the pit side surface and pits 10 of the stamper 11 can easily be formed to a uniform thickness from the inside circumference side to the outside circumference side of the stamper 11.

Furthermore, plugging the center hole 3' with a cap 4 and dripping the radiation curable resin 7 onto the cap 4 improves the uniformity of the thickness of the radiation curable resin 7 film.

Figure 5A:
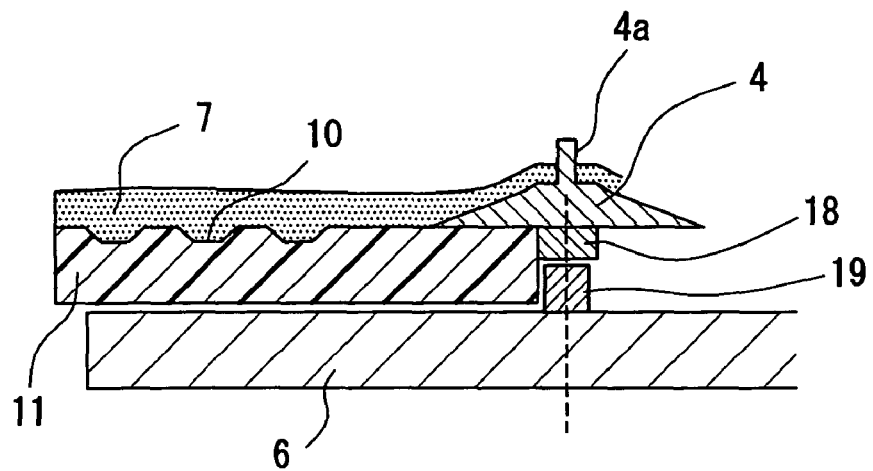
FIGS. 5A to 5C are side section views through the substrate, stamper and other parts in the intermediate layer formation process of an optical disc manufacturing process according to a second embodiment of the present invention.

A layer of radiation curable resin 7 with substantially uniform thickness can thus be formed on the pit side surface and pits 10 of the stamper 11 as shown in FIG. 5A.

Figure 5B:
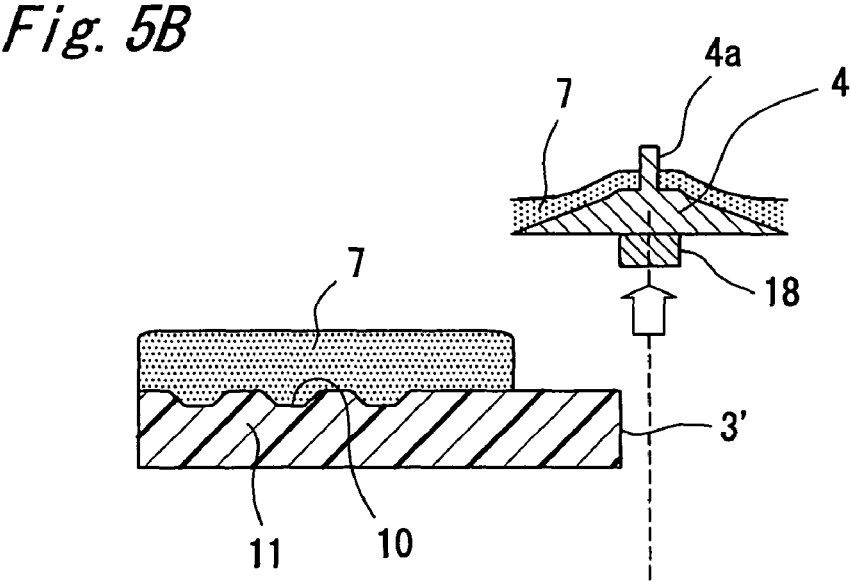

(d) Next, as shown in FIG. 5B, the stud 4a of the cap 4 is held and pulled upward to move the cap 4 straight up and away from the stamper 11 (i.e., the stud 4a is pulled up to remove the cap 4 from the stamper 11).

Figure 5C:
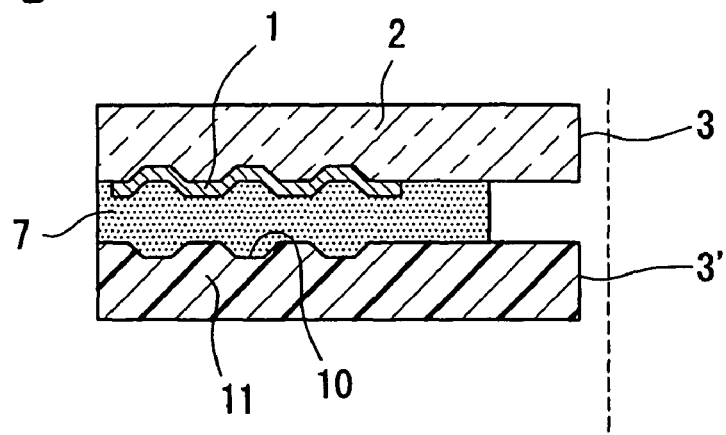

(e) As described in the first embodiment and shown in FIG. 5C, a substrate 2 with center hole 3 and data recording layer 1 is pressed to the stamper 11 in a vacuum chamber with the data recording layer 1 pressed into the radiation curable resin 7 film. The recording-layer-side surface and data recording layer 1 of the substrate 2 are pretreated to improve bonding between the substrate 2 and radiation curable resin 7 layer, i.e., intermediate layer 17. Alternatively, the substrate 2 could be made from a material with good adhesion to the radiation curable resin.

(f) The radiation curable resin 7 film is then cured as described in the first embodiment.

(g) The stamper 11 is then separated from the substrate 2, and another data recording layer 12 and transparent protective layer 13 are formed on the surface of the substrate 2. A protective coating 14 may also be disposed as needed (see FIGS. 3A to 3D).

This completes the optical disc. It will thus be apparent that the optical disc manufacturing method according to this second embodiment of the invention can easily manufacture, by means of a spin coating technique, an optical disc having two data recording layers 1, 12 separated by an intermediate layer 17 of uniform thickness.

Third Embodiment

An optical disc manufacturing method according to a third embodiment of the present invention is described next with particular reference to FIG. 6 and FIG. 7.

This embodiment differs from the first embodiment in the formation of the intermediate layer of the two layer structure.

This optical disc manufacturing method is described below.

(a) A radiation curable resin 7 layer is first formed on the substrate 2 as in the optical disc manufacturing method of the first embodiment (see FIGS. 1A to 1C and FIG. 2). The thickness of the radiation curable resin 7 layer, however, is thinner than in the first embodiment.

Figure 6A:
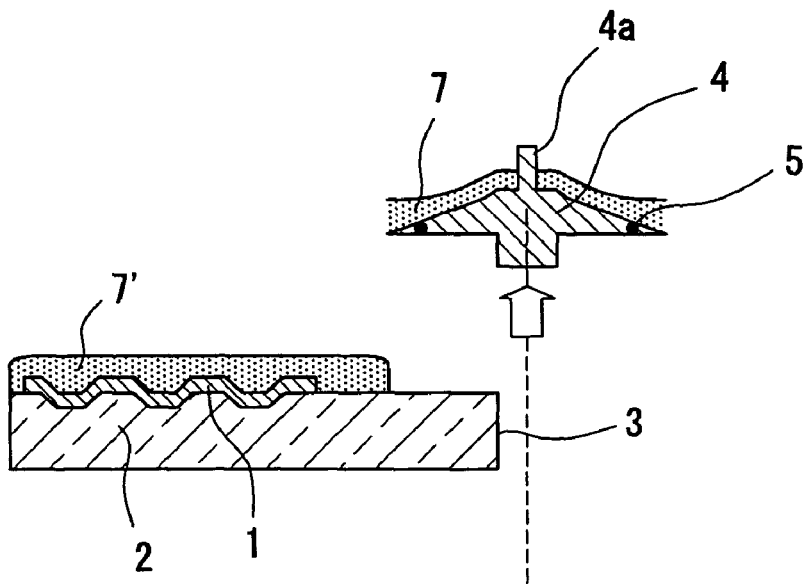
FIGS. 6A to 6C are side section views through the substrate, stamper and other parts in the intermediate layer formation process of an optical disc manufacturing process according to a third embodiment of the present invention.

(b) Next, as shown in FIG. 6A, the stud 4a of the cap 4 is held and pulled upward to move the cap 4 straight up and away from the substrate 2 (i.e., the stud 4a is pulled up to remove the cap 4 from the substrate 2).

(c) The radiation curable resin 7 on the substrate 2 is then exposed to radiation (such as UV light) to cure the resin and form cured layer 7'. Note that all or just part (such as only at the inside circumference part or the outside circumference part of the disc) of the radiation curable resin 7 film could be cured.

Figure 6B:
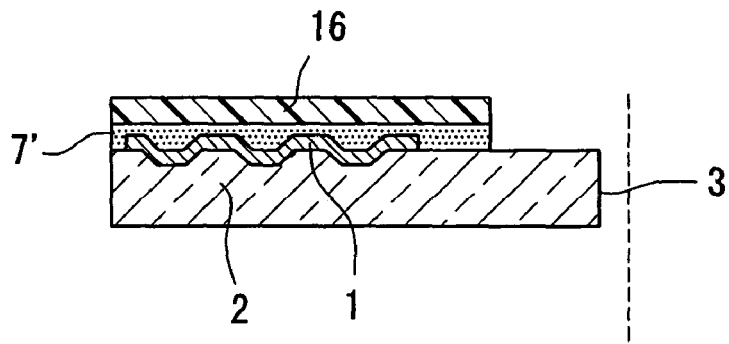

(d) Another radiation curable resin 16 is then applied on top of the cured layer 7' using a conventional spin coating technique, that is, not using a cap 4, as shown in FIG. 6B. The material or viscosity of this radiation curable resin 16 could be the same or different from the first radiation curable resin 7.

By applying the radiation curable resin in two steps, variation in the overall thickness of the radiation curable resin layer is made very small when the substrate 2 and stamper 11 are pressed (laminated) together.

More specifically, forming the intermediate layer separating the two data recording layers from a single layer composed of two sublayers instead of one thick layer further suppresses variation in the thickness of the intermediate layer. In this case, the first radiation curable resin is cured first and the stamper 11 is then pressed into the second uncured radiation curable resin 16 layer to form the data recording layer 1.

The radiation curable resin 16 could be applied by using the cap 4 as described above instead of using a conventional spin coating technique. In this case, the center hole 3 of the substrate 2 is closed by the cap 4 and the radiation curable resin 16 is dripped from substantially above the center of the center hole 3. This is described in detail further below.

If the radiation curable resin 16 is applied by using a conventional spin coating technique instead of using the cap 4, the substrate 2 is first turned slowly (at 60 rpm, for example) while dripping the radiation curable resin 16 from a single nozzle in a donut shape near the inside circumference part of the substrate 2 (i.e., around the center hole 3). The substrate 2 is then spun at a high speed (such as approximately 5000 rpm) to spread the radiation curable resin 16 substantially uniformly over the entire surface of the substrate 2.

Applying the radiation curable resin 7, 16 by spin coating in the optical disc manufacturing method according to this third embodiment of the invention is described next.

The spin coat application of the radiation curable resin 7 using the cap 4 is described first.

(1) The center hole 3 of the substrate 2 is first plugged by the cap 4 as described above before spin coating begins.

(2) Using a radiation curable resin 7 with 150 mPa.s viscosity, for example, the radiation curable resin 7 is dripped from substantially directly above the center hole 3. The radiation curable resin 7 was dripped at 0.3 g/second for 6 seconds from the time the substrate 2 started spinning. The substrate 2 was spun at 120 rpm for 3 seconds from the start of substrate 2 rotation, and was then set to 2000 rpm for 5 seconds.

(3) Substrate rotation was then accelerated at 2000 rpm/second for 1.5 seconds, and the substrate 2 was then stopped.

This forms a radiation curable resin 7 layer with an average thickness of approximately 17 μm. The resulting radiation curable resin 7 layer has a slope with the thickness gradually decreasing radially to the disc from the inside circumference side to the outside circumference side.

Applying the other radiation curable resin 16 by a conventional spin coating technique, that is, not using the cap 4, is described next.

(1) Using a radiation curable resin 16 with 150 mPa.s viscosity, for example, 0.5 g of the radiation curable resin 16 is dripped in a circle onto the surface of the substrate 2, and the substrate 2 is then spun for 5 seconds at 4000 rpm, for example.

This produces a radiation curable resin 16 layer with an average thickness of approximately 8 μm. This layer of radiation curable resin 16, however, has a slope with a thickness gradually increasing radially from the inside circumference side to the outside circumference side of the disc.

As will be known from this third embodiment, an intermediate layer 17' with overall uniform thickness can be formed by combining a radiation curable resin 7 film that gets thinner from the inside circumference to the outside circumference side of the substrate with a radiation curable resin 16 film that gets thicker from the inside circumference to the outside circumference side of the substrate.

It will also be obvious that the two radiation curable resin layers (7, 16) could each be formed to a uniform thickness to achieve an intermediate layer 17' of uniform thickness.

Figure 6C:
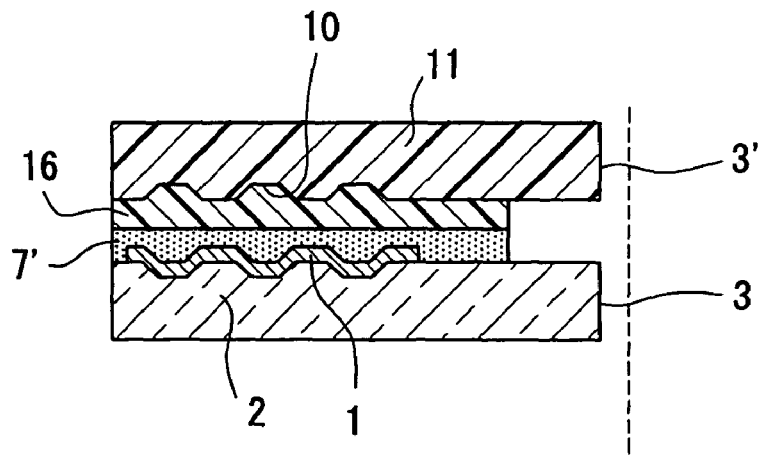

(e) Next, as shown in FIG. 6C and described in the first embodiment, the stamper 11 is pressed into the radiation curable resin 16 layer to form a reverse image of the pits 10, and the stamper 11 is pressed to the substrate 2 in a vacuum chamber. The pit side surface of the stamper 11 is pretreated to improve separation from the intermediate layer 17' as further described below, or the stamper 11 is made from a material with good release performance.

Figure 7A:
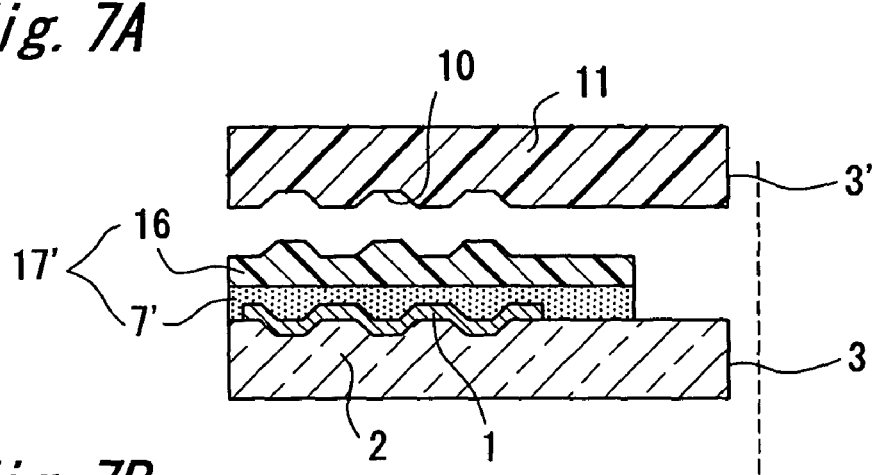
FIGS. 7A to 7D are side section views through the substrate and other layers in the data recording layer formation process of an optical disc manufacturing process according to a third embodiment of the present invention.

(f) As shown in FIG. 7A, the radiation curable resin 16 is then exposed to radiation (UV light in this embodiment) to cure and form a two-layer intermediate layer 17'. The stamper 11 is then separated from the substrate 2. This leaves an inverse pattern of the pits 10 in the stamper 11 formed in the intermediate layer 17'.

Figure 7B:
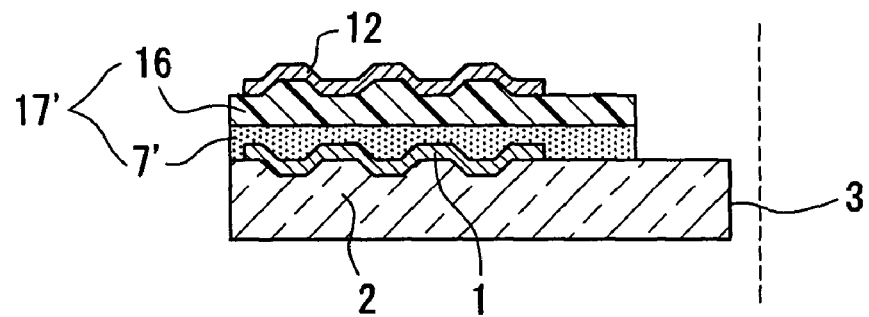

(g) As shown in FIG. 7B, another data recording layer 12 (recording film or reflective film) is then formed over the pits and lands (or groove) in the intermediate layer 17'.

Figure 7C:
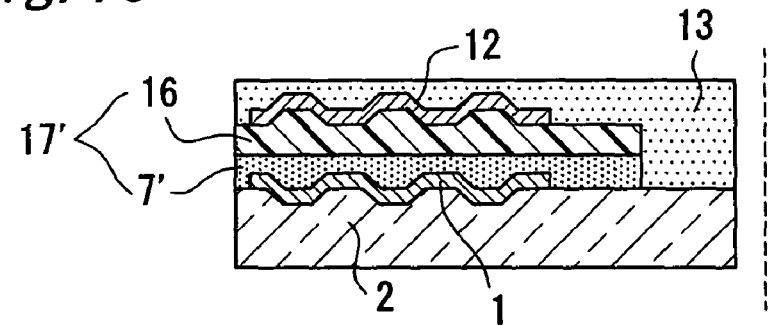

(h) To protect the optical disc, a protective layer 13 made from a transparent radiation curable resin is formed on the intermediate layer 17' and substrate 2 as shown in FIG. 7C.

The resulting optical disc has an intermediate layer 17' composed of two sublayers between two data recording layers.

Figure 7D:
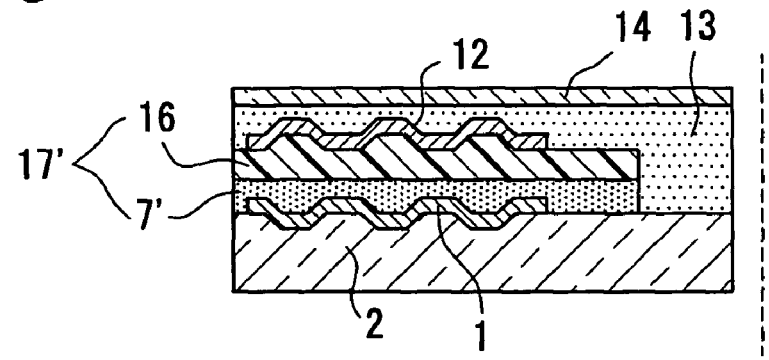

As shown in FIG. 7D and also described above, a transparent protective coating 14 could be formed over the transparent protective layer 13 if even stronger protection is needed for the optical disc.

The optical disc manufacturing method according to this third embodiment of the invention can thus easily manufacture, by a spin coating technique, an optical disc having two data recording layers 1, 12 separated by a uniformly thick intermediate layer 17' composed of two sublayers.

It will be obvious that while the intermediate layer 17' in this third embodiment of the invention is composed of two sublayers, the intermediate layer 17' could alternatively be a lamellar structure of three or more layers.

Variations of the optical disc manufacturing method according to the above-described third embodiment are described next below.

(First Variation)

This first variant optical disc manufacturing method differs from the method of the third embodiment in that the substrate 2 and stamper 11 are exchanged for each other to manufacture the disc. Otherwise, this first variant is the same as the method of the third embodiment.

As in the method of the third embodiment described above, this first variant thereof can be used to easily manufacture, by a spin coating technique, an optical disc having two data recording layers 1, 12 separated by a uniformly thick intermediate layer 17' composed of two sublayers.

(Second Variation)

In this second variant of the above optical disc manufacturing method, a cured layer 7' is first formed on the substrate 2 by curing a radiation curable resin 7 as in the third embodiment. This second variant method differs from the method of the third embodiment, however, in that the radiation curable resin 16 layer is formed by conventional spin coating or spin coating by using the cap 4 on the pit side surface of the stamper 11 rather than on the substrate 2. The substrate 2 with the cured layer 7' formed thereon is then placed against the radiation curable resin 16 layer on the stamper 11, and the substrate 2 and stamper 11 are pressed together.

This second variation is otherwise identical to the method of the third embodiment. This second variant of the third embodiment can also be used to easily manufacture, by a spin coating technique, an optical disc have two data recording layers 1, 12 separated by a uniformly thick intermediate layer 17' composed of two sublayers.

(Third Variation)

This third variant of the optical disc manufacturing method of the third embodiment differs from the second variant thereof described above in that the substrate 2 and stamper 11 are exchanged for each other to manufacture the disc. Otherwise, this variation is the same as the above second variant.

As in the method of the third embodiment of the invention and the first and second variations thereof described above, this third variant method can be used to easily manufacture by a spin coating technique an optical disc have two data recording layers 1, 12 separated by a uniformly thick intermediate layer 17' composed of two sublayers.

Fourth Embodiment

Figure 8:
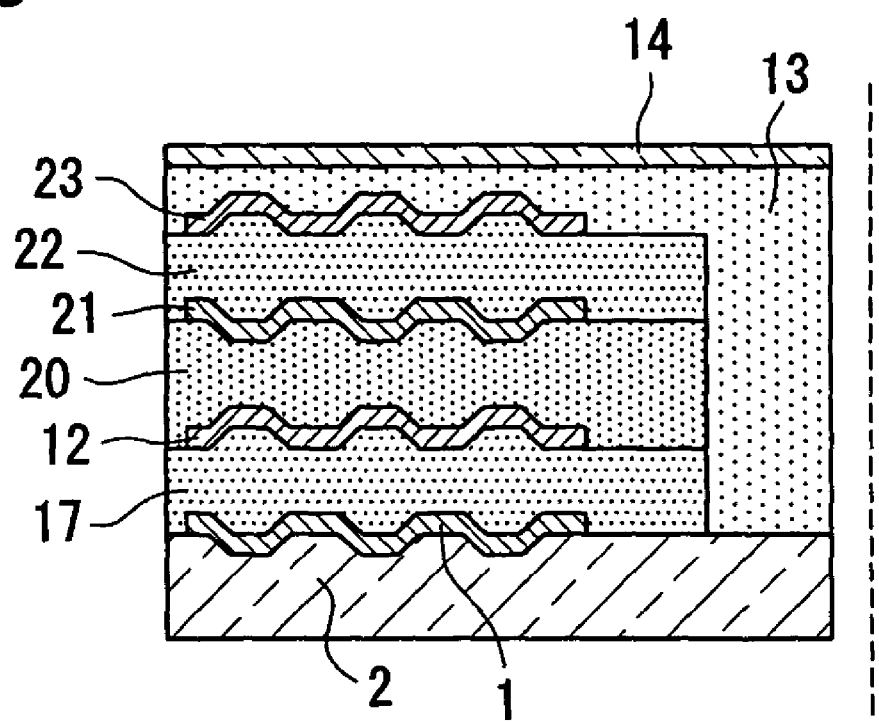
FIG. 8 is a side section view of an optical disc having four data recording layers manufactured by a manufacturing method according to a fourth embodiment of the present invention.

An optical disc according to a fourth embodiment of the invention is described next with particular reference to FIG. 8. This optical disc differs from the optical disc produced by the manufacturing method of the first to third embodiments described above in that this optical disc has four data recording layers 1, 12, 21, and 23. In addition, another intermediate layer 20 is formed between the second data recording layer 12 and the third data recording layer 21 from the substrate 2 (the first data recording layer 1 is closest to the substrate 2). In addition, a further intermediate layer 22 is formed between the third data recording layer 21 and the fourth data recording layer 23 from the substrate 2.

An optical disc having these four data recording layers 1, 12, 21, and 23 is manufactured as described below.

(a) Using the same process described in the first embodiment, an intermediate layer 17 and data recording layer 12 are first formed on a substrate 2 having a first data recording layer 1.

(b) The processes shown in FIG. 1B and FIG. 1C, FIGS. 2A to 2C, and FIGS. 3A and 3B are then repeated to form intermediate layer 20 and data recording layer 21 on the substrate 2 having two data recording layers 1, 12.

(c) The processes shown in FIGS. 1B and 1C, FIGS. 2A to 2C, and FIGS. 3A and 3B are then repeated again to form intermediate layer 22 and data recording layer 23 on substrate 2, now having three data recording layers 1, 12, and 21 at the start of this step (c).

A transparent protective layer 13 and, as needed, a protective coating 14 are then formed on the surface as described in the first embodiment to complete the optical disc with four data recording layers 1, 12, 21, and 23.

It will be obvious that while this fourth embodiment describes manufacturing an optical disc with four data recording layers, the same technique could be used to manufacture optical discs with three or even five or more data recording layers.

An optical disc with three or more data recording layers could also be manufactured by interchanging the positions of the substrate 2 and stamper 11 as described in the second embodiment.

Fifth Embodiment

Figure 10:
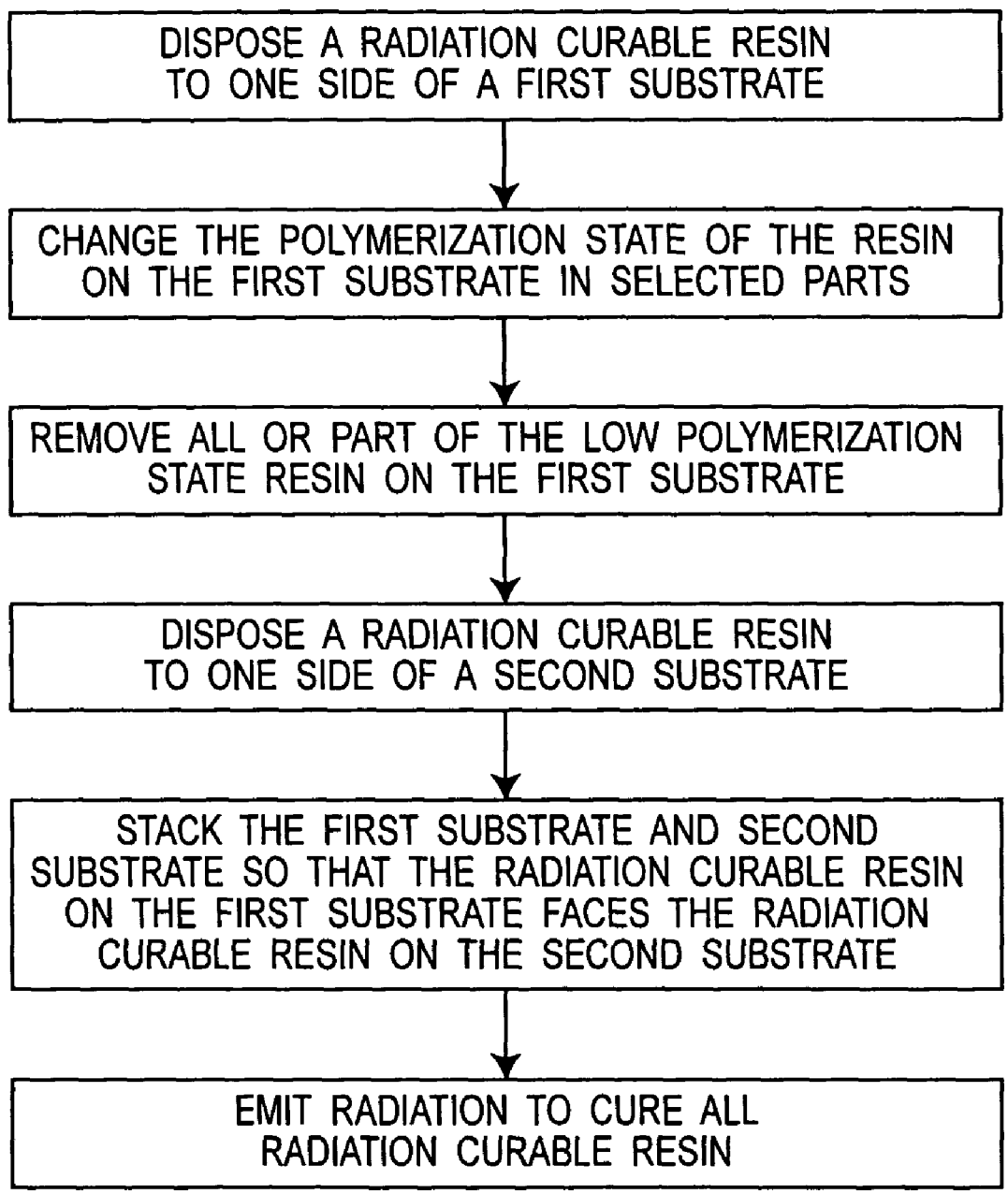
FIG. 10 is a flow chart of an optical disc manufacturing method according to a fifth embodiment of the present invention.

A manufacturing method for an optical data recording medium according to a fifth embodiment of the present invention is described next with reference to FIG. 10. FIG. 10 is a flow chart of this manufacturing method. This optical disc manufacturing method includes the following steps.

(a) Preparing a first substrate.
(b) Closing the center hole of the first substrate with a cap.
(c) Coating a main surface of the first substrate with a radiation curable resin.
(d) Partially curing the radiation curable resin coating the first substrate.
(e) Removing all or part of the uncured part of the radiation curable resin coating the first substrate.
(f) Preparing a second substrate.
(g) Closing the center hole of the second substrate with a cap.
(h) Coating a main surface of the second substrate with a radiation curable resin.
(i) Stacking the first substrate and second substrate together so that the radiation curable resin on the first substrate contacts the radiation curable resin on the second substrate.
(j) Exposing the radiation curable resin to radiation to cure the resin.
(k) Removing the first substrate from the second substrate.

A specific example of this optical disc manufacturing method is described below. Note that symmetrical parts such as the stamper are shown in part with the axis of symmetry in the accompanying figures.

Figure 11A:
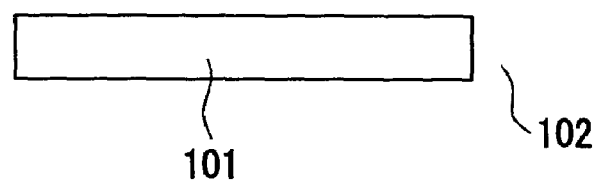
FIGS. 11A to 11C show steps in the optical disc manufacturing method according to a fifth embodiment of the present invention.

(a) A first substrate 101 is first prepared as shown in FIG. 11A. This first substrate 101 is made of polyolefin approximately 0.5 thick, having a 120 mm outside diameter, with a 15 mm diameter center hole 102. This first substrate 101 is made by injection molding. It should be noted that a polyolefin material is selected here notably for its ease of release from the radiation curable resin as more fully described below, but other materials, such as acrylic resin, could be used instead. Further, this first substrate is approximately 0.5 mm thick, but a different thickness could be used as needed.

Figure 11B:
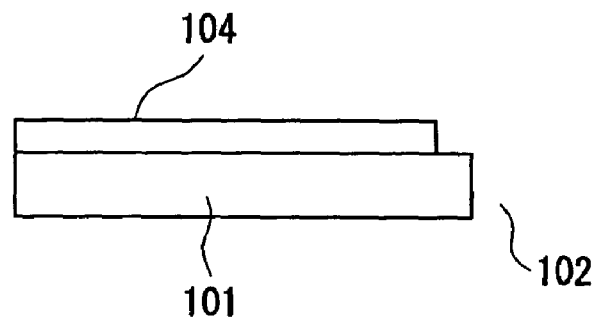
Figure 11C:
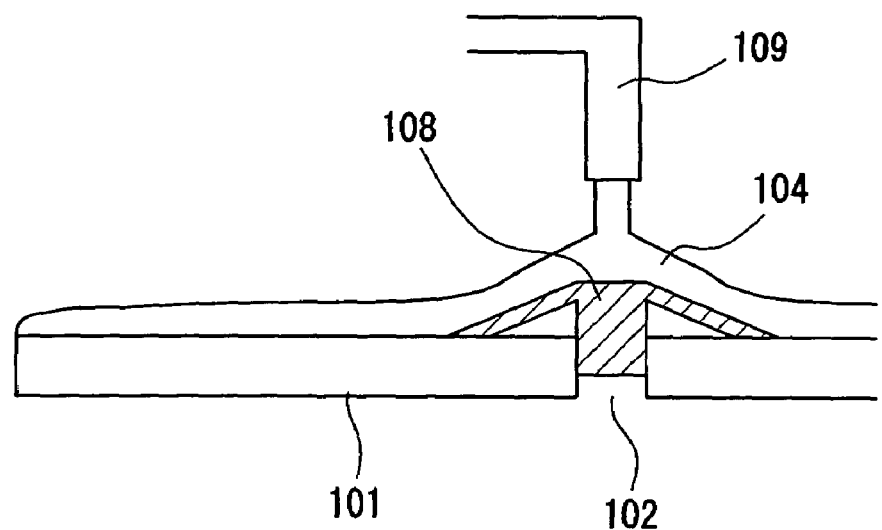

(b) The center hole 102 of the first substrate 101 is then closed with a cap 108 as shown in FIG. 11C.

(c) As shown in FIG. 11B, radiation curable resin A 104 is dripped onto the cap 108 from a nozzle 109 and thus onto the first substrate 101, which is turned at approximately 300 rpm for approximately 25 seconds to spread the radiation curable resin A 104 by a spin coating technique across the radial direction of the first substrate 101 to achieve a thickness of approximately 70 μm. The viscosity of this radiation curable resin A 104 is controlled to approximately 320 mPa.s.

Figure 12A:
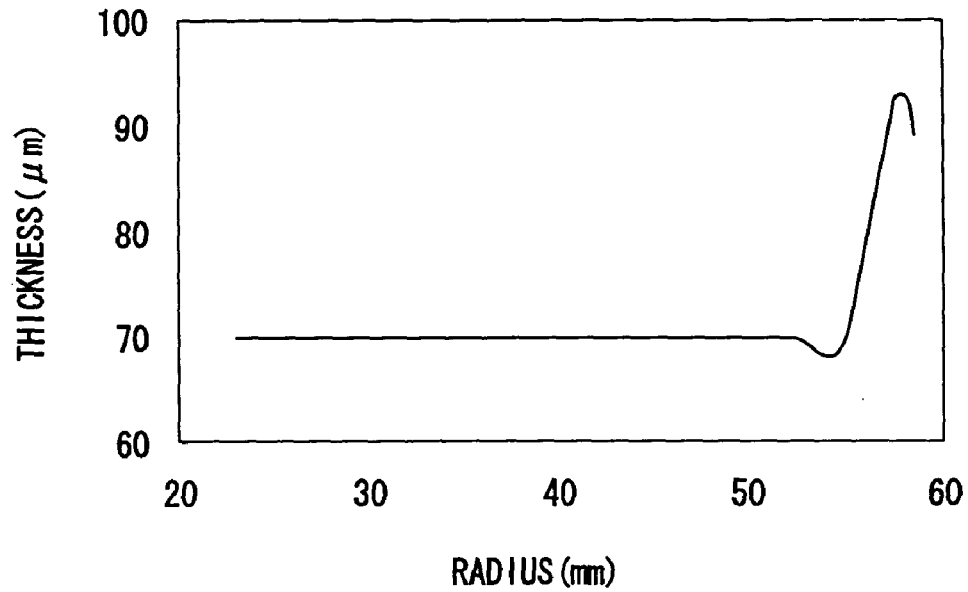
FIG. 12A is a graph showing the thickness distribution in the radial direction of the applied radiation curable resin A in the optical disc manufacturing method according to a fifth embodiment of the present invention.

The thickness distribution of the radiation curable resin in the radial direction at this time is shown in FIG. 12A.

(d) Resin on the part of the first substrate 101 inside an approximately 56 mm radius of the center is then exposed to radiation to cure the radiation curable resin A 104 in this inside circumference part while leaving the part outside this radius uncured. The outside edge area of the substrate 2 at this time is shown enlarged in FIG. 12B.

Figure 12B:
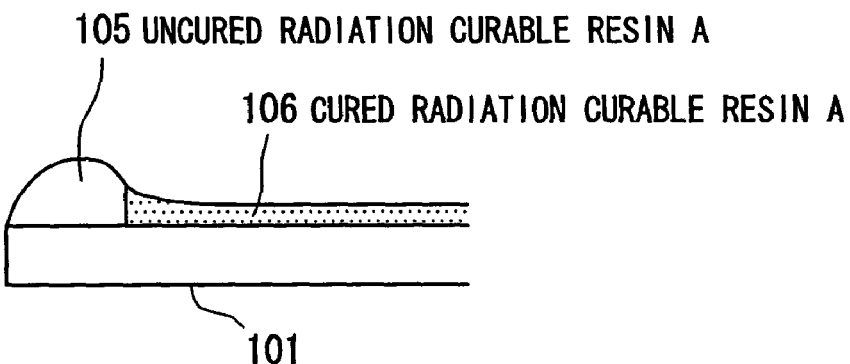
FIGS. 12B and 12C show steps in this optical disc manufacturing method.

If the resin is applied by spin coating, a ridge of resin is formed due to surface tension at the outside edge of the substrate as shown in FIG. 12B. Because this ridge of resin becomes a source of thickness variation, this resin ridge is left uncured.

Figure 12C:
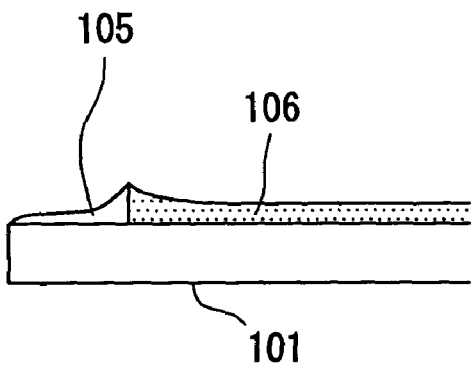

(e) The first substrate 101 is then spun again for approximately 7 seconds at approximately 1000 rpm, thereby removing approximately half of the uncured accumulation as shown in FIG. 12C.

This radiation curable resin is a resin that is cured by exposure to radiation. Depending on the resin, the radiation includes all forms of electromagnetic wave and particle wave radiation. Specific examples of radiation curable resins include UV curing resins that harden when exposed to UV light, and resins that cure when exposed to electron beams. When a radiation curable resin is cured, the resin is highly polymerized; when uncured, the resin is in a low polymerization state such as liquid form.

Figure 13A:
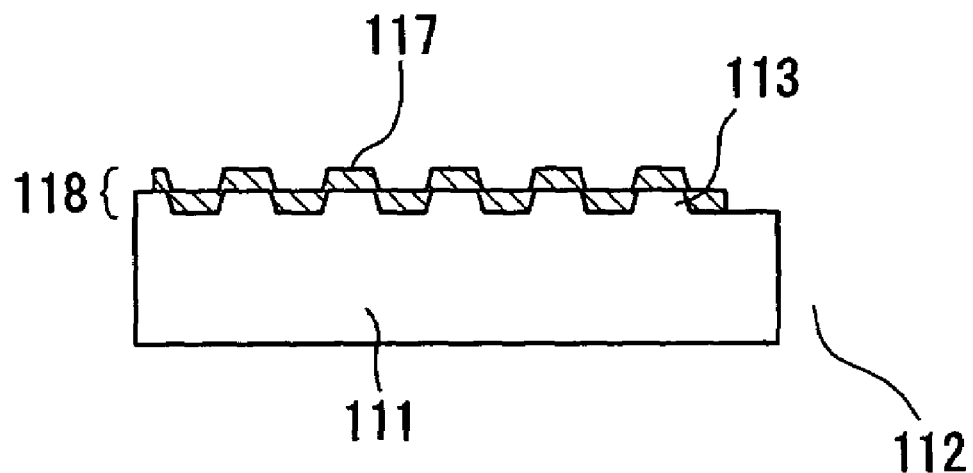
FIGS. 13A and 13B show steps in the optical disc manufacturing method according to a fifth embodiment of the present invention.

(f) A second substrate 111 is prepared as shown in FIG. 13A. This second substrate 111 is polycarbonate approximately 1.1 mm thick, having a 120 mm outside diameter, with a 15 mm center hole 112, and has on one side thereof a data recording layer SA 118 having a guide groove 113 and a recording layer 117 composed of multiple thin film layers. This second substrate 111 is also manufactured by injection molding. The second substrate is also not limited to polycarbonate, and could be made of a different resin.

(g) The center hole 112 of this second substrate 111 is then plugged with a cap.

Figure 13B:
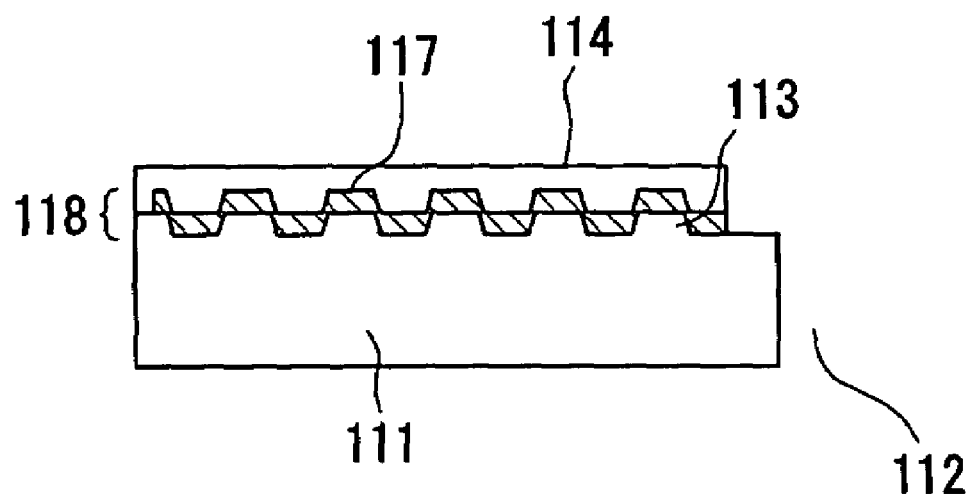

(h) As shown in FIG. 13B, radiation curable resin B 114 controlled to a 320 mPa.s viscosity is dripped from above the center hole 112 while spinning the second substrate 111 at approximately 900 rpm for approximately 25 seconds to coat the data recording layer SA 118 with radiation curable resin B 114 to a thickness of approximately 30 μm by spin coating. Though not described here and shown in the figures, a ridge of radiation curable resin B 114 is also formed at the outside edge of the substrate as shown in FIG. 12B. The radiation curable resin B 114 could also be applied by spin coating without using the cap. It is preferable as described further below that the thickness of the transparent layer is uniform.

Figure 14A:
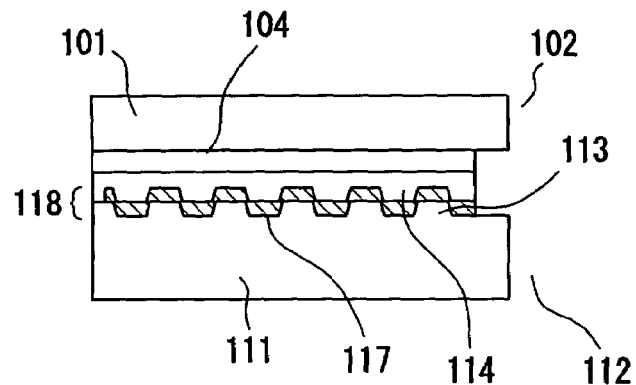
FIGS. 14A and 14B show steps in the optical disc manufacturing method according to a fifth embodiment of the present invention.

(i) As shown in FIG. 14A, the first substrate 101 and second substrate 111 are then stacked so that radiation curable resin A and radiation curable resin B are together. This operation is performed in a vacuum so that no bubbles form between the first and second substrates 101 and 111.

(j) After stacking the first substrate 101 and second substrate 111, radiation curable resins A and B are then cured by exposure to radiation. Because the radiation will not pass through the data recording layer SA 118, a material enabling the radiation to pass is used for the first substrate 101 and the radiation is emitted to this side of the stack.

Figure 14B:
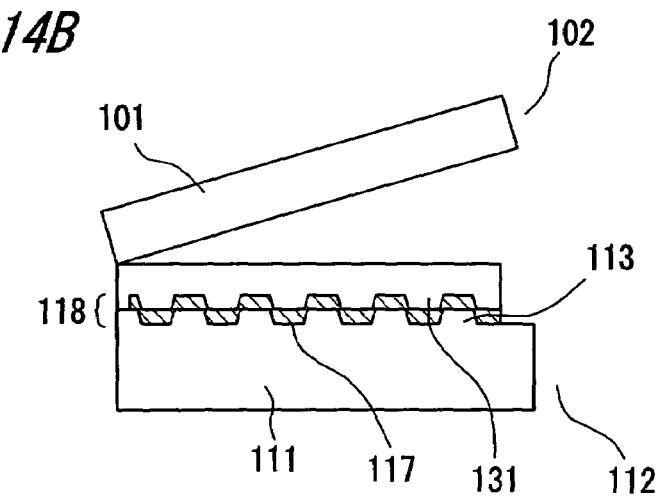

(k) Then, as shown in FIG. 14B, the first substrate 101 is separated from the second substrate 111. Note that the radiation curable resin A is a material that easily releases the first substrate 101.

These steps form a transparent layer 131 made of radiation curable resin A and radiation curable resin B. As a result, a transparent layer 131 of uniform thickness is formed on the data recording layer SA 118.

If the substrates are put together with the entire surface of both radiation curable resins A and B uncured, the pressure applied to the radiation curable resin may vary in places due to the two substrates not being perfectly parallel and force being applied unequally. This can result in the thickness of the radiation curable resin changing greatly in parts.

However, if the part of radiation curable resin A inside the specified radius is first cured as described above, the thickness of the cured part of the resin A can no longer change. Any change in thickness that might occur when the two substrates are combined is therefore extremely small, and a uniform resin thickness can be easily achieved. In addition, the ridge of radiation curable resin A at the outside edge of the substrate is left uncured, and approximately half of the resin forming this uncured ridge is spun off by centrifugal force. This enables the outside edge ridge of radiation curable resin B to fill the depleted edge part of radiation curable resin A when the two substrates are pressed together. As a result, the thickness of the transparent layer 131 when radiation curable resins A and B are combined can be made substantially uniform over the entire surface of the data recording layer. By using this method, discs were successfully manufactured with an average data recording layer thickness of approximately 100 μm and thickness variation of only about 2 μm.

Figure 14C:
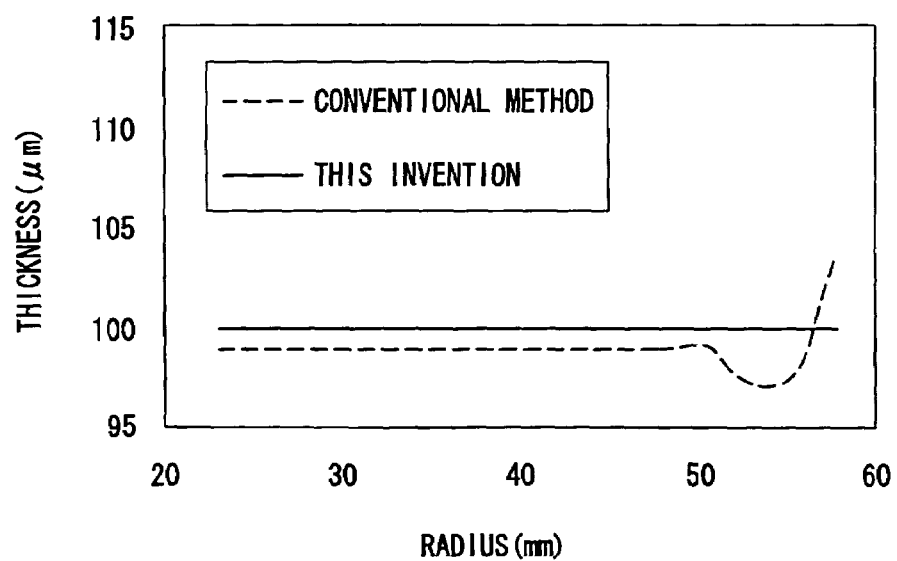
FIG. 14C shows the thickness distribution in the radial direction of the resulting transparent layer.

FIG. 14C compares thickness distribution through the radial direction of a transparent layer manufactured with the method of the present invention and a transparent layer manufactured with a conventional method whereby the edge ridge of radiation curable resin A is also cured. It will be obvious from FIG. 14C that the sudden change in resin thickness at the outside edge is significantly improved and resin thickness is made uniform by the method of our invention.

While a second substrate with only one data recording layer is used in this example, it will be obvious that the invention can also be applied to optical discs having multiple data recording layers.

Furthermore, radiation curable resins A and B are the same material in this example, but they could be different materials. The materials must be able to form a transparent layer with uniform thickness and be easily applied. Further, it is preferred that the materials can be easily separated from the first substrate 101.

The part of radiation curable resin A inside a specified radius of the substrate is cured and the uncured ridge of resin at the disc edge is spun off by centifugal force. It will be apparent that radiation curable resin B could also be cured in part and the uncured part thereof spun off.

Furthermore, whether the resin is cured in part at the inside circumference or outside circumference part of the disc, how large of an area is cured, and how much uncured resin is then spun off are preferably determined to achieve a transparent layer of uniform thickness. The part that is cured will vary according to the viscosity and thickness of the radiation curable resin that is used, but the cured part preferably extends into the area outside 90% of the radius of the first substrate 101.

Yet further, the resin does not need to be fully cured and could be only partially cured. The "uncured" part described above could also be partially cured. What is important is that the cured state (polymerization state) of the radiation curable resin is varied in part so that the thickness of the transparent layer is easily made uniform.

Furthermore, radiation curable resin B is applied directly on the data recording layer SA in this embodiment, but it could be applied after first applying a protective coating to the data recording layer SA.

Radiation curable resin A could also be applied after first treating the first substrate for easy mold release.

This embodiment of the invention has been described using, by way of example, a recordable data recording layer including thin films enabling data to be written and read. It will also be obvious that the invention can be applied to read-only media in which a data signal is recorded as pits and lands in a reflective layer.

The invention has also been described with reference to data recording media having a 120 mm outside diameter, but the invention obviously can be also applied to media of other sizes, including smaller data recording media with an 80 mm outside diameter.

Furthermore, the thickness of the finished optical disc is controlled to 1.2 mm so that the disc is the same thickness as CD, DVD, and other optical recording media. The invention shall not be so limited, however, and can be applied to optical data recording media of a different thickness.

High density optical data recording media can thus be manufactured by using the manufacturing method described in this embodiment of the present invention.

Sixth Embodiment

Figure 15:
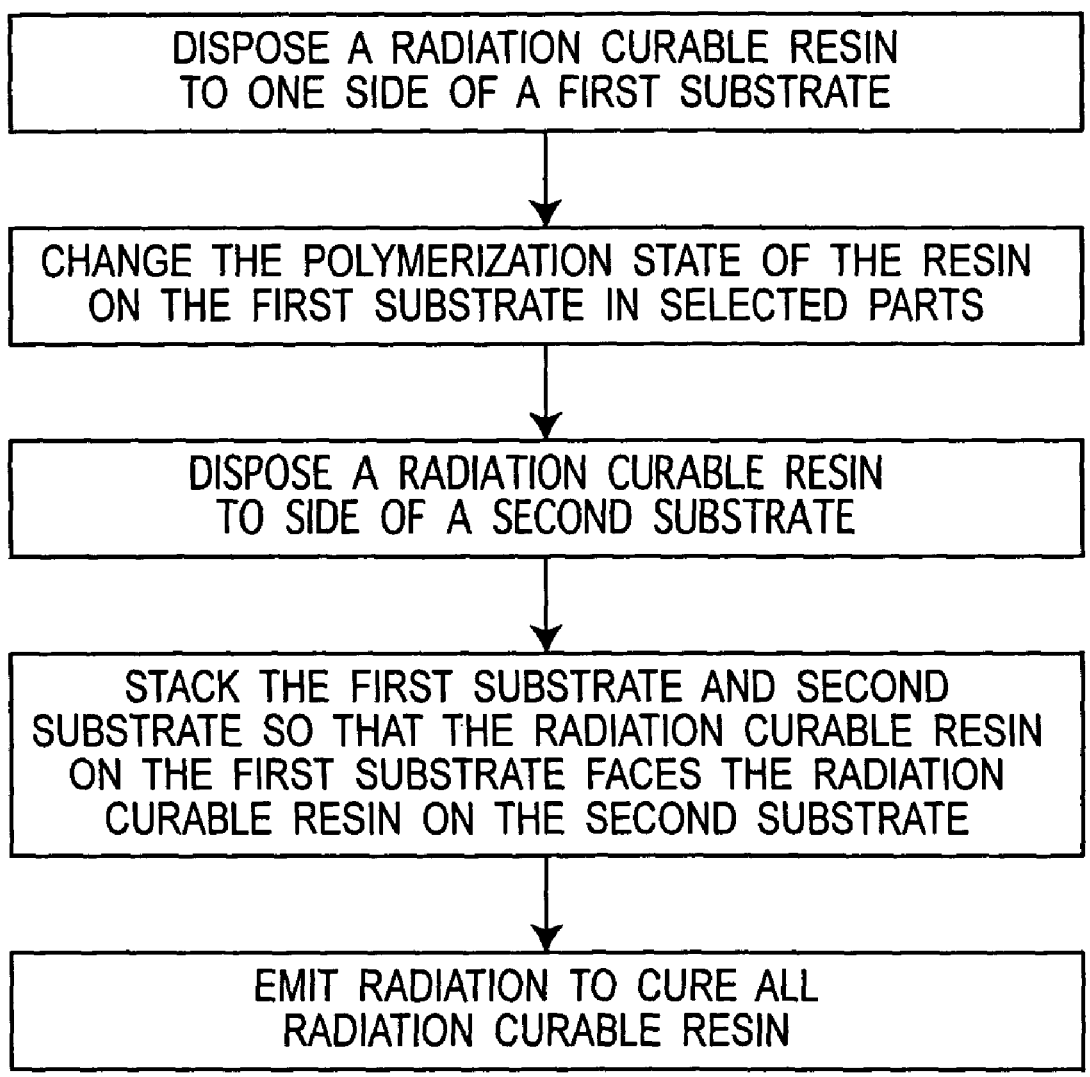
FIG. 15 is a flow chart of an optical disc manufacturing method according to a sixth embodiment of the present invention.

An optical disc manufacturing method according to a sixth embodiment of the present invention is described next. FIG. 15 is a flow chart of this manufacturing method.

This manufacturing method differs from the method of the fifth embodiment in that the uncured part of radiation curable resin A is not spun off, i.e., the uncured part remains on the substrate. This causes the resin ridges left in radiation curable resins A and B to collapse when the two substrates are placed together, thereby correcting the sudden increase in thickness at the substrate edge.

A specific example of this optical disc manufacturing method is described below. Note that symmetrical parts such as the stamper are shown in part including the axis of symmetry in the accompanying figures.

Figure 16A:
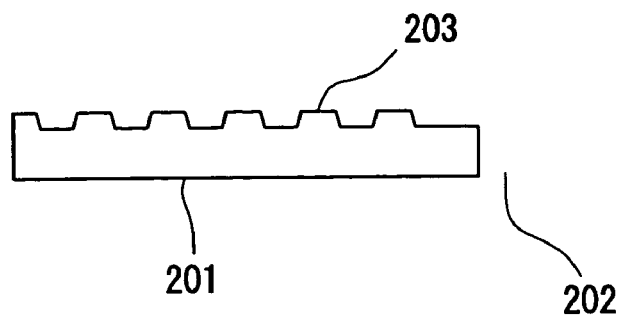
FIGS. 16A and 16B show steps in the optical disc manufacturing method according to a sixth embodiment of the present invention.

(a) A first substrate 201 is first prepared as shown in FIG. 16A. This first substrate 201 is made of polyolefin approximately 0.5 thick, having a 120 mm outside diameter, with a 15 mm diameter center hole 202. A guide groove 203 is formed on one side of the substrate. This first substrate 201 is made by injection molding, and is used as a stamper for transferring a signal pattern.

It should be noted that a polyolefin material is selected here notably for its good mold release properties as more fully described below, but other materials, such as acrylic resin, could be used instead. Further, this first substrate is approximately 0.5 mm thick, but a different thickness could be used as needed.

(b) The center hole 202 of the first substrate 201 is then closed with a cap.

Figure 16B:
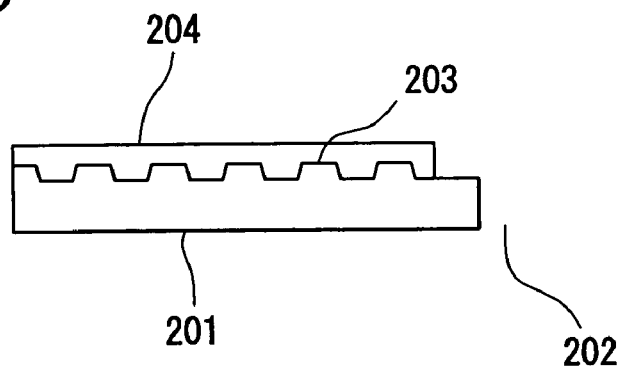

(c) As shown in FIG. 16B, radiation curable resin A 204 is dripped onto the cap, and the first substrate 201 is turned at approximately 2000 rpm for approximately 5 seconds to spread the radiation curable resin A 204 by spin coating and form an approximately 20 μm thick coat on the guide groove 203 in the first substrate 201. The viscosity of this radiation curable resin A 204 is controlled to approximately 150 mPa.s.

Figure 16C:
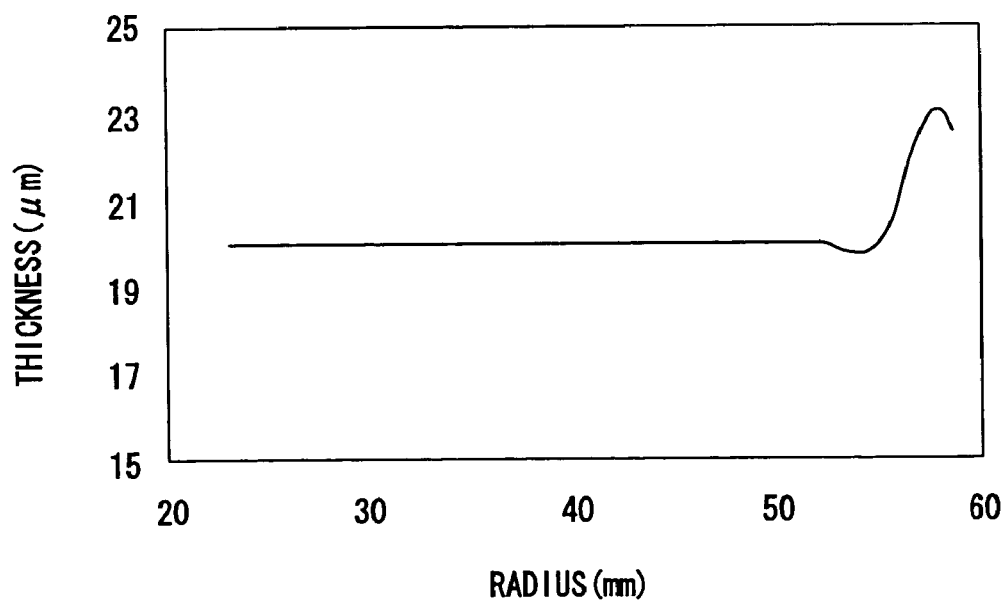
FIG. 16C shows the thickness distribution in the radial direction of the applied radiation curable resin A.

The thickness distribution of the radiation curable resin A in the radial direction at this time is shown in FIG. 16C.

Figure 17A:
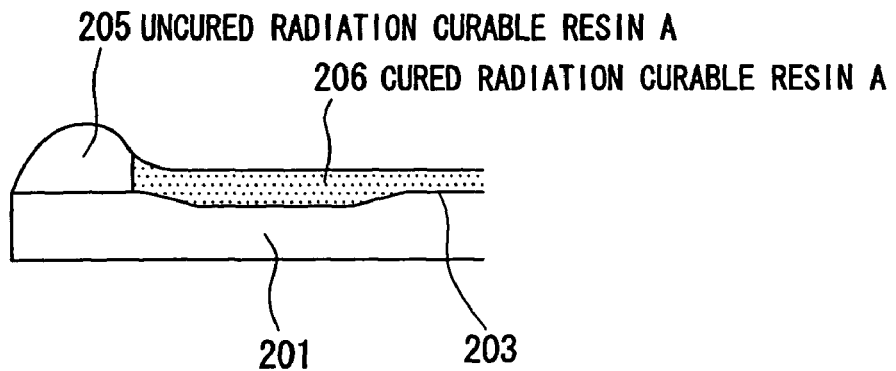
FIG. 17A shows the radiation curable resin A near the outside circumference edge of the substrate in an optical disc manufacturing method according to a sixth embodiment of the invention.

(d) FIG. 17A is an enlarged view of the outside edge part of first substrate 201. As shown in FIG. 17A, resin on the part of the first substrate 201 inside an approximately 58 mm radius of the center is then exposed to radiation to cure the radiation curable resin A in this inside circumference area while leaving the part outside this radius uncured.

If the resin is applied by spin coating, a ridge of resin is formed due to surface tension at the outside edge of the substrate. Because this ridge of resin becomes a source of thickness variation, this resin ridge is left uncured to achieve uniform thickness. This embodiment differs from the method of the fifth embodiment in that this uncured ridge is left intact, that is, the uncured ridge is not spun off by centrifugal force.

Figure 17B:
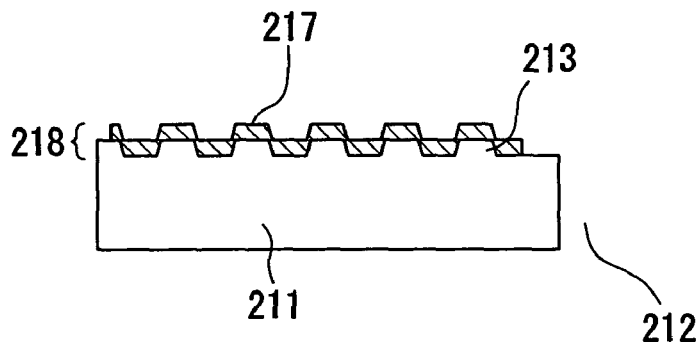
FIGS. 17B and 17C show steps in this optical disc manufacturing method.

(e) A second substrate 211 is prepared as shown in FIG. 17B. This second substrate 211 is polycarbonate approximately 1.1 mm thick, have 120 mm outside diameter, with a 15 mm center hole 212, and has on one side thereof a data recording layer SA 218 having a guide groove 213 and a recording layer 217 composed of multiple thin film layers. This second substrate 211 is also manufactured by injection molding. The second substrate is also not limited to polycarbonate, and could be made of a different resin.

(f) The data recording layer SA is then coated by spin coating a radiation curable resin B 214 controlled to approximately 450 mPa.s viscosity to an approximate 5 μm thickness while spinning the substrate for approximately 18 seconds at approximately 5000 rpm. Unlike when radiation curable resin A was applied, radiation curable resin B 214 was applied without capping the center hole, but the center hole could be capped and the resin dripped from substantially above the center hole. What is important is that the thickness of the intermediate layer described below is uniform.

Figure 18A:
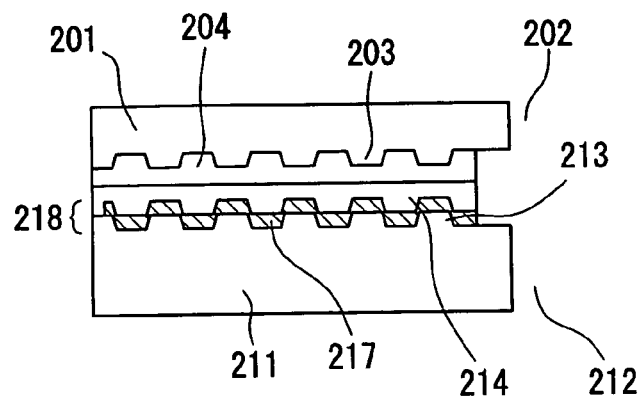
FIG. 18A shows a step in the optical disc manufacturing method of the sixth embodiment of the invention.

(g) As shown in FIG. 18A, the first substrate 201 and second substrate 211 are then stacked so that radiation curable resin A and radiation curable resin B are together. This operation is performed in a vacuum so that no bubbles form between the first and second substrates 201 and 211.

Figure 17C:
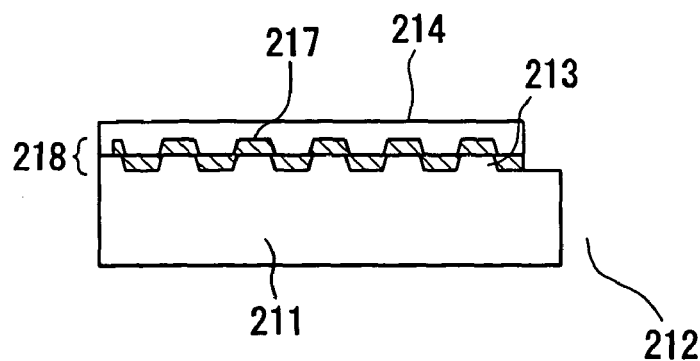

(h) After stacking the first substrate 201 and second substrate 211, radiation curable resins A and B are then cured by exposure to radiation. Curing radiation curable resins A and B together forms intermediate layer 221 (see FIG. 17C). Because the radiation will not pass through the data recording layer SA 218, a material enabling the radiation to pass is used for the first substrate 201 and the radiation is emitted to this side of the stack.

If the substrates are put together with the entire surface of both radiation curable resins A and B uncured, the pressure applied to the radiation curable resin may vary in places due to the two substrates not being perfectly parallel and force being applied unequally. This can result in the thickness of the radiation curable resin changing greatly in parts.

However, if the part of radiation curable resin A inside the specified radius is first cured as described above, the thickness of the cured part of the resin A can no longer change. Any change in thickness that might occur when the two substrates are combined is therefore extremely small, and a uniform resin thickness can be easily achieved.

Furthermore, because the ridge of radiation curable resin A at the outside edge of the substrate is not cured, this ridge in radiation curable resin A and a corresponding ridge in radiation curable resin B collapse when the two substrates are pressed together. The thickness of the intermediate layer formed by curing radiation curable resins A and B can thus be made substantially uniform throughout the entire signal recording area of the disc. By using this method, discs were successfully manufactured with an average intermediate layer thickness of approximately 25 μm and thickness variation of only about 1 μm.

Figure 18B:
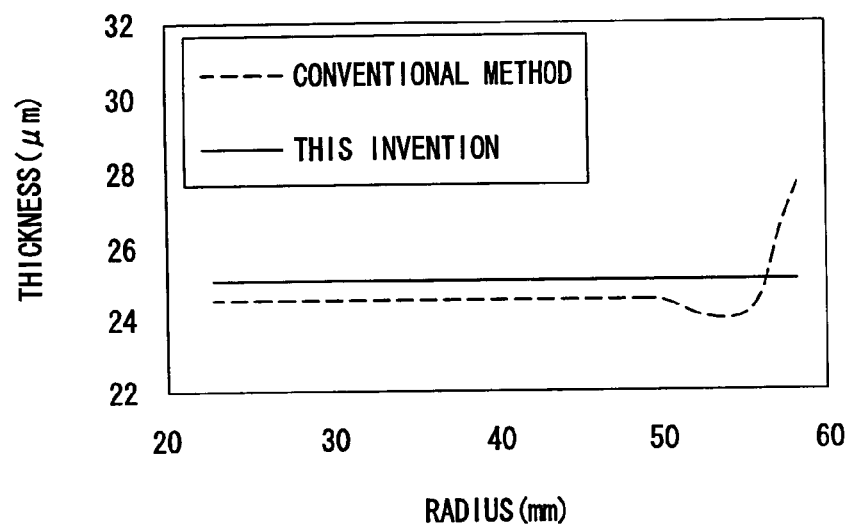
FIG. 18B shows the thickness distribution of the intermediate layer in the radial direction.

FIG. 18B compares thickness distribution through the radial direction of an intermediate layer manufactured with the method of the present invention and an intermediate layer manufactured with a conventional method whereby the edge ridge of resin is also cured. It will be obvious from FIG. 18B that the sudden change in resin thickness at the outside edge is significantly improved and resin thickness is made uniform by the method of our invention.

Figure 18C:
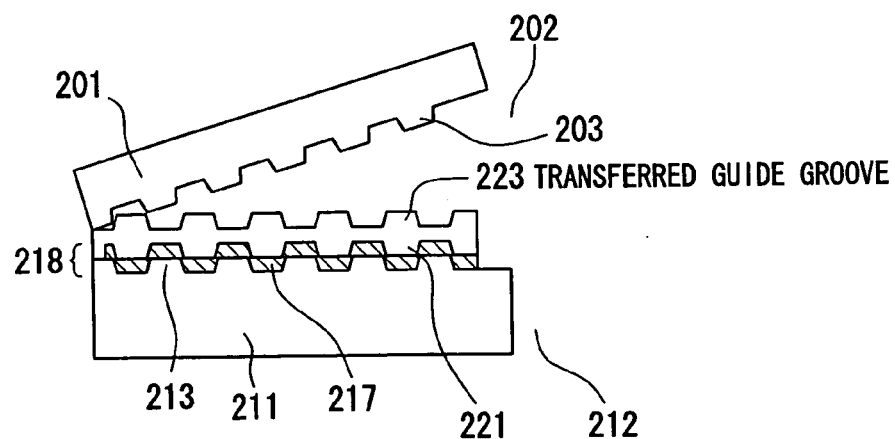
FIG. 18C shows another step in this optical disc manufacturing method.

(i) Then, as shown in FIG. 18C, the first substrate 201 is separated from the second substrate 211. Note that the radiation curable resin A is a material that easily releases the first substrate 201 and can easily transfer the guide groove in the first substrate 201. This results in the guide groove being transferred from the first substrate 201 to the intermediate layer 221.

Figure 19A:
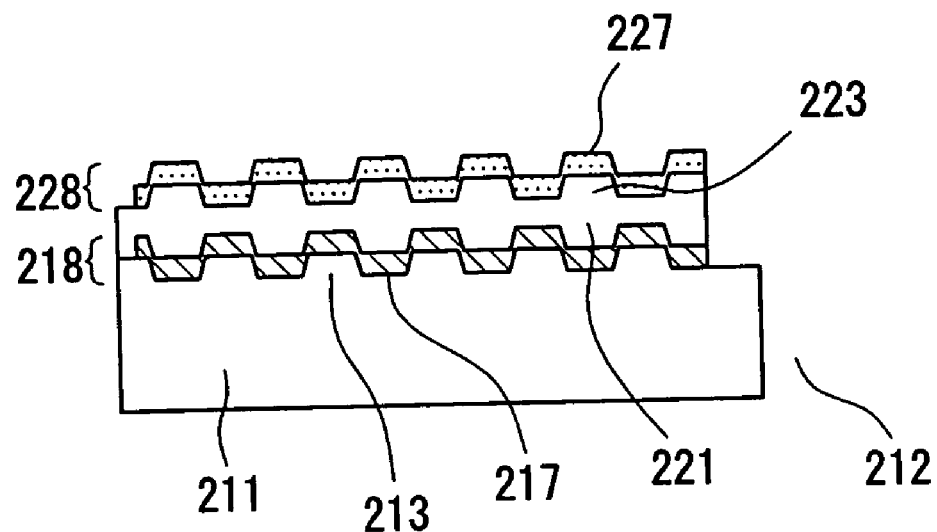
FIGS. 19A and 19B show steps in an optical disc manufacturing method according to the sixth embodiment of the present invention.

(j) As shown in FIG. 19A, a recording layer 227 including multiple thin film layers is formed in the transferred guide groove to form data recording layer SB 228. In an optical disc whereby two data recording layers can be recorded and read from the same side of the disc, the data recording layer SB 228 is the layer closer to the read/write beam source and is therefore semi-transparent.

Figure 19B:
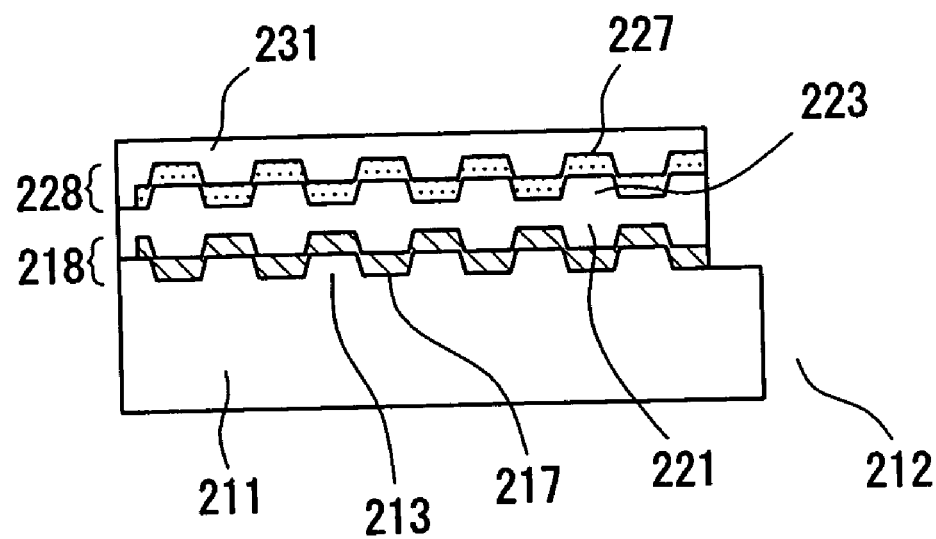

An approximately 75 μm thick transparent layer 231 is formed to the shape of the data recording layer SB 228 as shown in FIG. 19B by the above process. This transparent layer 231 was formed in the present embodiment by applying a sheet material with a radiation curable resin, but the sheet material could be applied with an adhesive material, or the layer could be formed by spin coating, or some other method could be used. A material that is substantially transparent to the read/write beam is obviously preferable.

Furthermore, radiation curable resins A and B are different materials in this example, but they could be the same material. The materials must be able to form a transparent layer with uniform thickness and be easily applied. Further the materials preferably can be easily separated from the first substrate 201, and can preferably easily transfer the guide groove or other pattern from the first substrate 201.

Part of radiation curable resin A is cured in the example described above, but radiation curable resin A could be left uncured while curing radiation curable resin B in part. Which resin film is cured in part and which part of the resin film is cured are desirably determined so that the thickness of the resulting intermediate layer is uniform.

Furthermore, this "cured" state could be partially cured instead of completely cured, and the uncured part could be partially cured. More particularly, the polymerization state of the radiation curable resin is preferably varied in parts so that uniform thickness can be easily achieved in the intermediate layer and the guide groove can be easily transferred.

Furthermore, radiation curable resin B is applied directly on the data recording layer SA in this embodiment, but it could be applied after first applying a protective coating to the data recording layer SA.

Radiation curable resin A could also be applied to the guide groove of the first substrate after first treating the substrate for easy mold release.

This embodiment of the invention has been described using, by way of example, a recordable data recording layer including thin films enabling data to be written and read. It will also be obvious that the invention can be applied to read-only media in which a data signal is recorded as pits and lands in a reflective layer.

The invention has also been described with reference to data recording media having a 120 mm outside diameter, but the invention obviously can be also applied to media of other sizes, including smaller data recording media with an 80 mm outside diameter.

Furthermore, the thickness of the finished optical disc is controlled to 1.2 mm so that the disc is the same thickness as CD, DVD, and other optical recording media. The invention shall not be so limited, however, and can be applied to optical data recording media of a different thickness.

High density optical data recording media can thus be manufactured using the manufacturing method described in this embodiment of the present invention.

Seventh Embodiment

Figure 20:
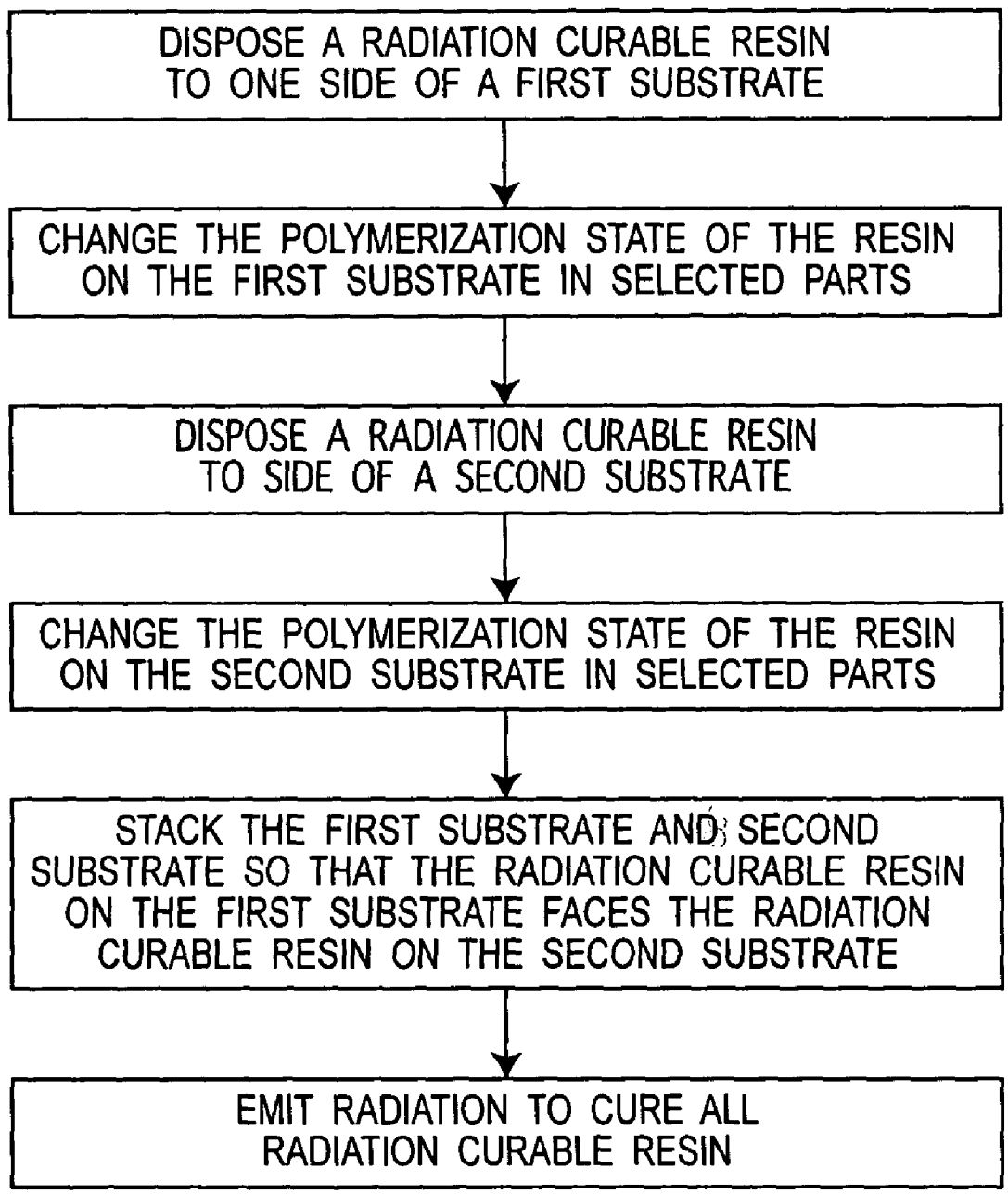
FIG. 20 is a flow chart of an optical disc manufacturing method according to a seventh embodiment of the present invention.

An optical disc manufacturing method according to a seventh embodiment of the present invention is described next. FIG. 20 is a flow chart of this manufacturing method.

This manufacturing method differs from the method of the fifth and sixth embodiments in that a step for curing radiation curable resin B in part is provided before the step for combining the first substrate with the second substrate. By first curing radiation curable resin B in part, radiation curable resins A and B can be prevented from mixing in the uncured parts, and contact with the first substrate can be prevented.

A specific example of this optical disc manufacturing method is described below. Note that symmetrical parts are shown in part with the axis of symmetry in the accompanying figures.

Figure 21A:
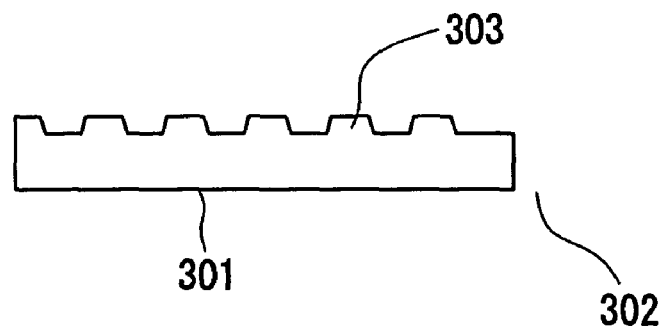
FIGS. 21A and 21B show steps in an optical disc manufacturing method according to a seventh embodiment of the present invention, and FIG. 21C) shows applied radiation curable resin A near the outside edge of the substrate.

(a) A first substrate 301 is first prepared as shown in FIG. 21A. This first substrate 301 is made of polycarbonate approximately 0.5 thick and having a 120 mm outside diameter with a 15 mm diameter center hole 302. A guide groove 303 is formed on one side of the substrate 301. This first substrate 301 is made by injection molding, and is used as a stamper for transferring a signal pattern.

It should be noted that this first substrate 301 could be made from a material other than polycarbonate, such as an acrylic, polyolefin, or other resin. Further, this first substrate 301 is approximately 0.5 mm thick, but a different thickness could be used as needed.

Figure 21B:
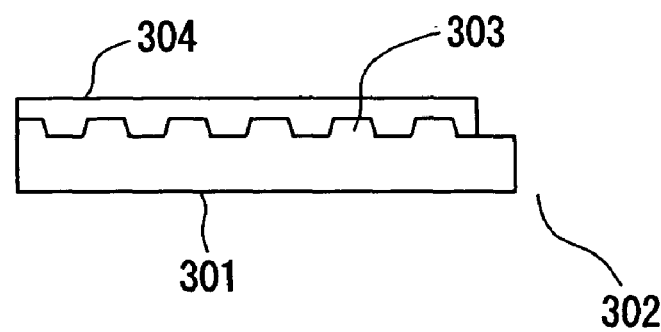

(b) As shown in FIG. 21B, a radiation curable resin A made of the same material as radiation curable resin A in the sixth embodiment is applied by spin coating as in the sixth embodiment to form an approximately 20 μm thick film of radiation curable resin A 304 over the guide groove.

Figure 21C:
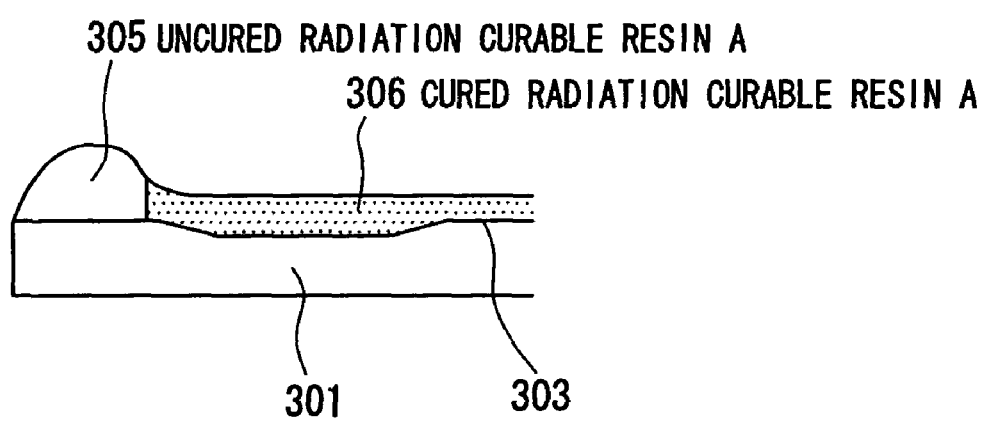

(c) As shown in the enlarged view in FIG. 21C, the radiation curable resin A within an approximately 58 mm radius of the substrate center is cured by exposure to radiation, and the resin outside this radius is left uncured.

Figure 22A:
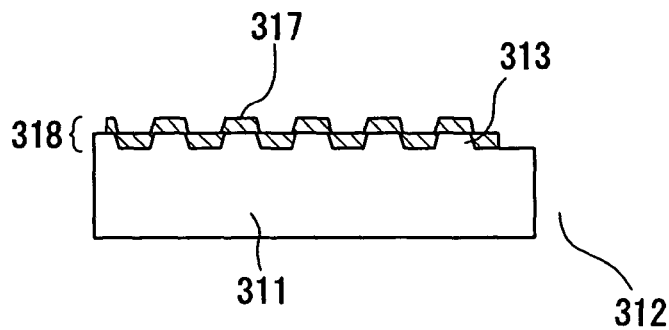
FIGS. 22A and 22B show steps in an optical disc manufacturing method according to a seventh embodiment of the present invention.

(d) A second substrate 311 is prepared as shown in FIG. 22A. This second substrate 311 is polycarbonate approximately 1.1 mm thick, having a 120 mm outside diameter, with a 15 mm center hole 312, and has on one side thereof a data recording layer SA 318 having a guide groove 313 and a recording layer 317 composed of multiple thin film layers. This second substrate 311 is also manufactured by injection molding. The second substrate is also not limited to polycarbonate, and could be made of a different resin.

Figure 22B:
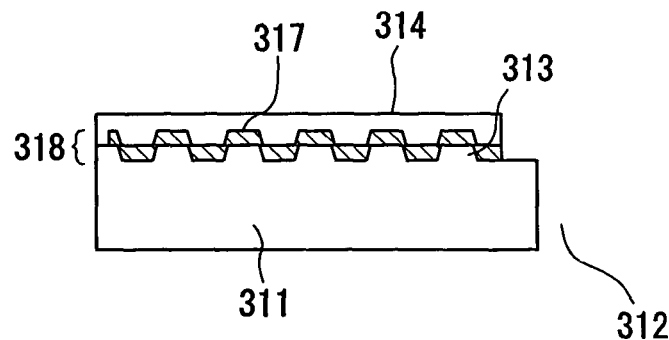
Figure 22C:
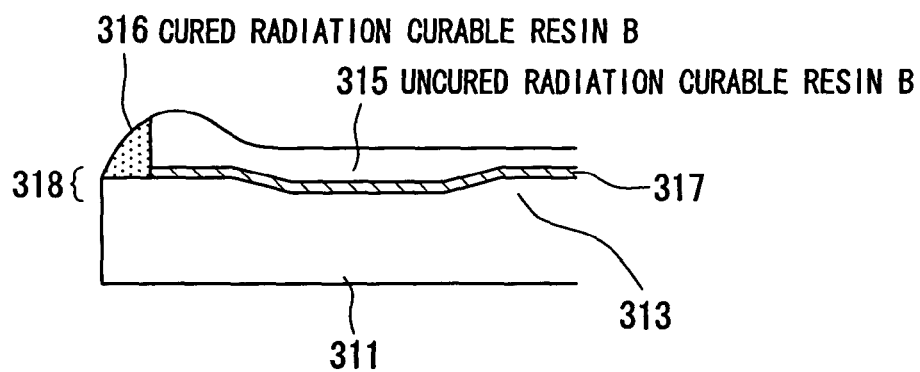
FIG. 22C shows applied radiation curable resin B near the outside edge of the substrate.

(e) Radiation curable resin B 314 is then applied to the data recording layer SA 318 by spin coating to form an approximately 5 μm thick film as shown in FIG. 22B. Radiation curable resin B was applied without capping the center hole, but the center hole could be capped and the resin dripped from substantially above the center hole similar to spin coating the radiation curable resin A.

(f) After radiation curable resin B 314 is applied, the part of resin B outside an approximately 59 mm radius from the disc center is exposed to radiation and cured. The part of resin B inside this radius is not cured.

Figure 23A:
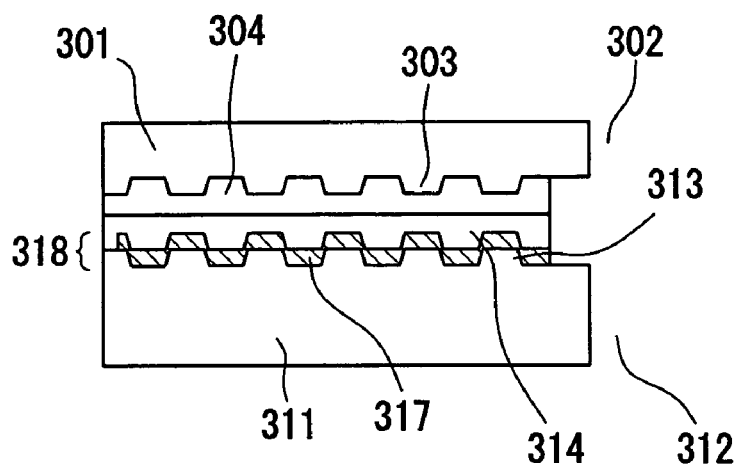
FIGS. 23A and 23B show steps in an optical disc manufacturing method according to the seventh embodiment of the present invention.

(g) As shown in FIG. 23A, the first substrate and second substrate are then stacked so that radiation curable resin A and radiation curable resin B are together. This operation is performed in a vacuum so that no bubbles form between the two substrates.

(h) After stacking the first substrate and second substrate, radiation curable resins A and B are then cured by exposure to radiation.

Figure 23B:
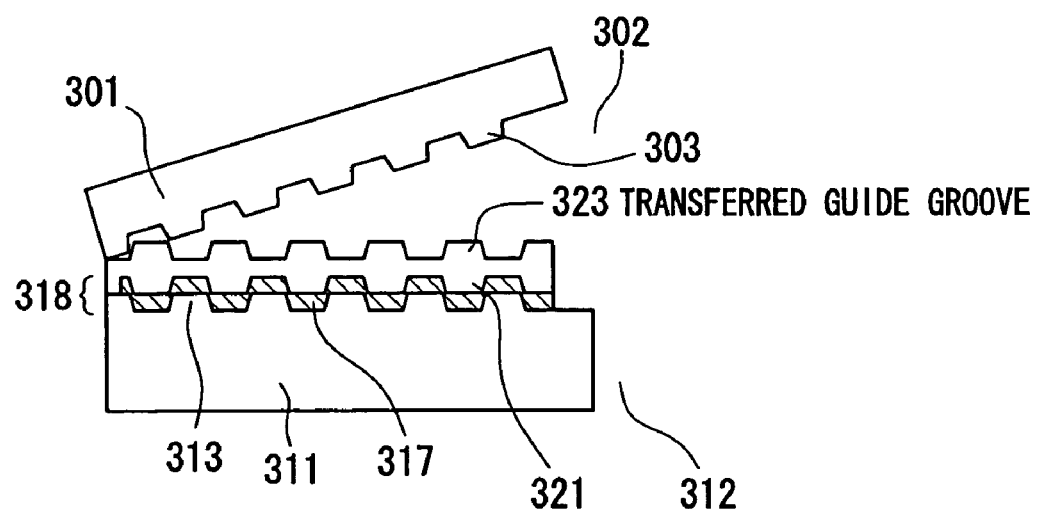

(i) The first substrate is then removed as shown in FIG. 23B.

This results in the guide groove being transferred from the first substrate 301 to the intermediate layer 321 formed from the combination of radiation curable resins A and B.

Radiation curable resin A in this embodiment is selected so that it has extremely low adhesion with polycarbonate and enables easy transfer of the guide groove or other pattern in the first substrate. Radiation curable resin B, however, is chosen so that it has strong adhesion to polycarbonate and the data recording layer SA. By thus using materials with different functions for radiation curable resins A and B, these resins can be selected from a wider range of materials, and a polycarbonate or other low cost material widely used with optical discs can be used for the first substrate.

However, if, as in the sixth embodiment, the first substrate and second substrate are put together while the entire surface of radiation curable resin B is uncured, resins A and B can mix in the outside edge part where resin A is also uncured and resin B can bleed from the outside edge and contact the first substrate, preventing the first substrate from later being separated from the second substrate.

This can be avoided, however, by curing only the outside edge part of resin B, thereby preventing contact of resin B with the first substrate and enabling the first substrate to be easily and cleanly removed.

Because thickness variations can occur if too wide of an area is cured at the outside edge of the substrate, the area to be cured is preferably determined with consideration for thickness variation and ease of substrate release. We found that the results are best when the cured area of resin B extends from the center to at least 90% of the radius of the second substrate. As in the sixth embodiment, the method of the present embodiment results in a uniform thickness.

It should be noted that if the same effect can be achieved without using radiation curable resins having different characteristics, like resins could be used instead.

Forming a recording film on the transferred guide groove and forming a transparent layer in this embodiment are the same as described in the sixth embodiment, and further description thereof is thus omitted.

This embodiment of the invention has been described using, by way of example, a recordable data recording layer including thin films enabling data to be written and read. It will also be obvious that the invention can be applied to read-only media in which a data signal is recorded as pits and lands in a reflective layer.

The outside circumference part of radiation curable resin A is uncured and the outside circumference part of radiation curable resin B is cured in this embodiment of the invention, but it is also possible to cure both of the outside circumference part of radiation curable resin A and B. Further, it may also be possible to not cure both of the outside circumference parts of radiation curable resin A and B. Which is cured and what area of the resin film is cured should be determined so that the thickness of the intermediate layer is uniform.

Furthermore, this "cured" state could be partially cured instead of completely cured, and the uncured part could be partially cured. More particularly, the polymerization state of the radiation curable resin is preferably varied in parts so that uniform thickness can be easily achieved in the intermediate layer and the guide groove can be easily transferred.

High density optical data recording media can thus be manufactured by using the manufacturing method described in this embodiment of the present invention.

Eighth Embodiment

An optical disc manufacturing method according to an eighth embodiment of the present invention is described next.

The method of this embodiment differs from the methods of the sixth and seventh embodiments in that instead of using a liquid radiation curable resin B, a pressure-sensitive adhesive sheet is used. Using a material in preformed sheets assures extremely high thickness precision. There are cases in which sufficiently low thickness variation cannot be achieved by applying a liquid radiation curable resin. It is preferable in such cases to use a substantially solid material that can be manufactured to a specified thickness with extremely high precision. An example of such a material is a pressure-sensitive adhesive formed in sheets. By forming this sheet material on the second substrate instead of applying a liquid radiation curable resin B, extremely high thickness precision can be achieved and the same effect can be achieved by using the same method as described in the fifth and sixth embodiments.

High density optical data recording media can thus be manufactured using a manufacturing method according to this embodiment of the invention.

Ninth Embodiment

An optical disc manufacturing method according to a ninth embodiment of the present invention is described next.

The method described in the fifth embodiment of the invention forms a transparent layer of uniform thickness on the optical disc, and the methods described in the sixth and seventh embodiments easily produce a uniformly thick intermediate layer with a guide groove for reading and writing an optical disc having multiple recording layers. An intermediate layer could also be formed by using the method of the fifth embodiment, however, and a transparent layer could be formed by the methods of the sixth and seventh embodiments.

The best method is preferably selected considering the cost and labor involved, the required thickness precision, and other factors.

Tenth Embodiment

An optical disc manufacturing method according to a tenth embodiment of the present invention is described next.

Figure 24:
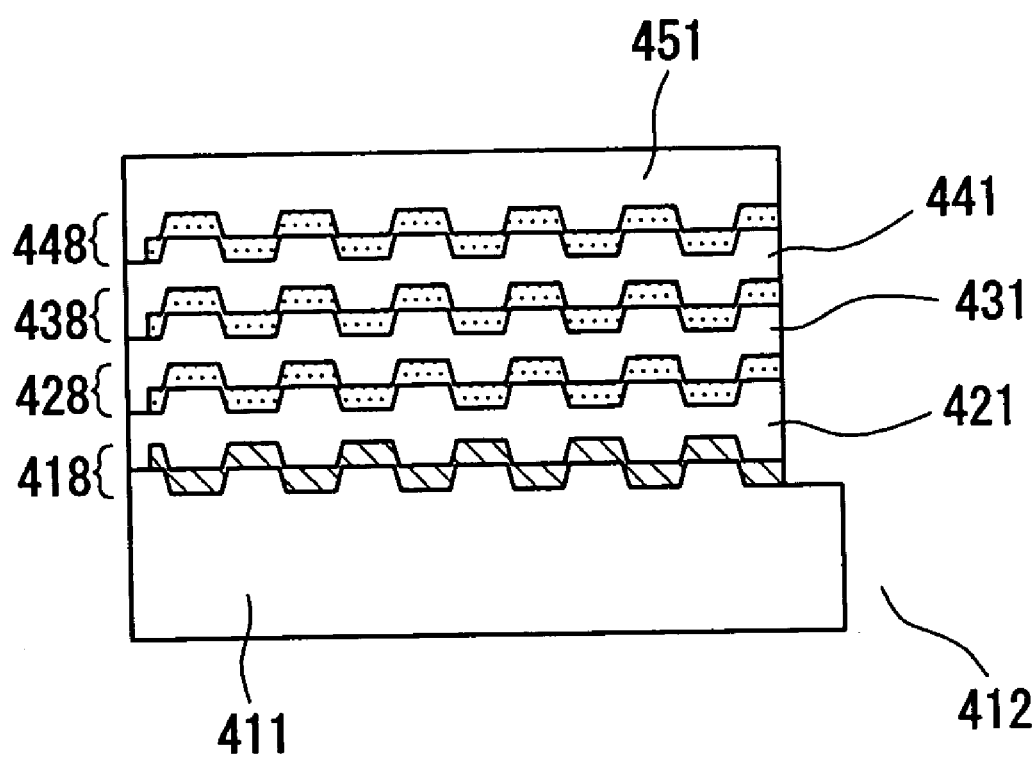
FIG. 24 is a side section view of an optical disc according to a tenth embodiment of the present invention.

The methods described in the sixth and seventh embodiments can produce an optical data recording medium having two data recording layers with extremely high thickness precision. An optical disc with more than two layers can be produced by repeating each of the steps preceding the formation of the transparent layer. An example of an optical data recording medium having four data recording layers is shown in FIG. 24.

Eleventh Embodiment

An optical disc manufacturing method according to an eleventh embodiment of the present invention is described next.

The methods of the fifth to tenth embodiments remove the first substrate to produce a layer of uniform thickness. Depending upon the application, however, it is not necessary to remove the first substrate. If a semi-transparent data recording layer is disposed to the first substrate, for example, the first substrate could be used as the transparent layer. It is therefore possible, by using the method described in the fifth to tenth embodiments, to produce a uniform layer disposed between two substrates.

Instead of removing the first substrate, a data recording layer could also be disposed to the side thereof opposite the side of the first substrate that contacts the second substrate. The present invention is able to produce layers of uniform thickness, and after those layers are produced other processes can be applied as may be needed.

As described above, the optical disc manufacturing method of the present invention can easily manufacture, by using a spin coating technique, optical data recording media having multiple data recording layers each separated by a uniformly thick intermediate layer including one or multiple sublayers.

The method of this invention can also easily manufacture layers of uniform thickness. More particularly, the method of our invention can produce transparent layers on a thin read/write side substrate of an optical data recording medium, and assure uniform thickness in the intermediate layers between each of the multiple data recording layers.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined by the appended claims, unless they depart therefrom.

What is claimed is:

1. A manufacturing method for an optical data recording medium, said method comprising:

preparing a first substrate;

applying a first radiation curable resin to a side of the first substrate;

curing a first part of the first radiation curable resin such that a second part of the first radiation curable resin is uncured;

preparing a second substrate having a groove or lands and pits on one side;

applying a second radiation curable resin to the side of the second substrate having the groove or the lands and pits;

curing a first part of the second radiation curable resin such that a second part of the second radiation curable resin is uncured;

laminating the first radiation curable resin of the first substrate and the second radiation curable resin of the second substrate together after both of the first and second radiation curable resins are partially cured in said curing of the first part of the first radiation curable resin and said curing of the first part of the second radiation curable resin;

curing the uncured second part of the first radiation curable resin and the uncured second part of the second radiation curable resin after the first radiation curable resin of the first substrate and the second radiation curable resin of the second substrate are laminated together in said laminating of the first radiation curable resin of the first substrate and the second radiation curable resin second substrate together; and removing the first substrate after the uncured second part of the first radiation curable resin and the uncured second part of the second radiation curable resin are cured in said curing of the uncured second part of the first radiation curable resin and the uncured second part of the second radiation curable resin.

2. A manufacturing method for an optical data recording medium according to claim 1, wherein said curing of the first part of the first radiation curable resin includes changing the cured state of the first radiation curable resin inside and outside a first radius of the first substrate.

3. A manufacturing method for an optical data recording medium according to claim 1, wherein a material used for the first radiation curable resin is different from a material used for the second radiation curable resin.

4. A manufacturing method for an optical data recording medium according to claim 1, wherein at least one of the first and second substrates is substantially transparent to radiation for curing at least one of the first and second radiation curable resins.

5. A manufacturing method for an optical data recording medium according to claim 1, wherein the second substrate has one or more recording layers.

6. A manufacturing method for an optical data recording medium according to claim 1, further comprising, after said removing of the first substrate, forming a recording layer over the second substrate.

7. A manufacturing method for an optical data recording medium according to claim 6, further comprising forming a transparent layer on the recording layer.

8. A manufacturing method for an optical data recording medium according to claim 1, further comprising, after said curing of the first part of the first radiation curable resin, removing all or part of the uncured second part of the first radiation curable resin applied outside of a first radius of the first substrate.

9. A manufacturing method for an optical data recording medium according to claim 1, wherein said applying of the first radiation curable resin to the side of the first substrate comprises applying the first radiation curable resin to the side of the first substrate by a spin coating method.

10. A manufacturing method for an optical data recording medium according to claim 9, wherein said applying of the first radiation curable resin to the side of the first substrate comprises:
closing a center hole of the first substrate with a capping member; and
coating the first radiation curable resin over the first substrate by dripping the first radiation curable resin from substantially above the center hole while spinning the first substrate centered on the center hole.

11. A manufacturing method for an optical data recording medium according to claim 1, wherein said applying of the second radiation curable resin to the side of the second radiation curable resin comprises applying the second radiation curable resin over a recording layer of the second substrate by a spin coating method.

12. A manufacturing method for an optical data recording medium according to claim 11, wherein said applying of the second radiation curable resin over the second substrate comprises:
closing a center hole of the second substrate with a capping member; and
coating the second radiation curable resin over the second substrate by dripping the second radiation curable resin from substantially above the center hole while spinning the second substrate centered on the center hole.

13. A manufacturing method for an optical data recording medium according to claim 2, wherein said curing of the first part of the second radiation curable resin includes changing the cured state of the second radiation curable resin inside and outside a second radius of the second substrate.

14. A manufacturing method for an optical data recording medium according to claim 13, wherein said curing of the first part of the second radiation curable resin includes exposing only a part of the second radiation curable resin applied over the second substrate to radiation so as to leave the second radiation curable resin applied inside of the second radius of the second substrate uncured.

15. A manufacturing method for an optical data recording medium according to claim 14, wherein the second radius is the same as or larger than the first radius.

16. A manufacturing method for an optical data recording medium according to claim 13, wherein the second radius is 90% or more of a radius of the second substrate.

17. A manufacturing method for an optical data recording medium according to claim 2, wherein said curing of the first part of the first radiation curable resin includes exposing only a part of the first radiation curable resin applied on the first substrate to radiation so as to leave the first radiation curable resin applied outside of the first radius of the first substrate uncured.

* * * * *